United States Patent
Tebbe

(10) Patent No.: US 6,911,791 B2
(45) Date of Patent: Jun. 28, 2005

(54) METHOD AND DEVICE FOR THE REDUCTION OF LOAD CYCLE OSCILLATIONS IN THE DRIVE TRAIN OF A MOTOR VEHICLE

(75) Inventor: Gerhard Tebbe, Geldersheim (DE)

(73) Assignee: Mannesmann Sachs AG, Schweinfurt (DE)

( * ) Notice: Subject to any disclaimer, the term of this patent is extended or adjusted under 35 U.S.C. 154(b) by 107 days.

(21) Appl. No.: 09/904,674

(22) Filed: Jul. 13, 2001

(65) Prior Publication Data
US 2002/0047417 A1 Apr. 25, 2002

(30) Foreign Application Priority Data

Jul. 21, 2000 (DE) ......................................... 100 35 521

(51) Int. Cl.$^7$ .............................................. H02K 33/00
(52) U.S. Cl. .................. 318/114; 318/318; 318/568.22; 318/433; 318/623; 123/192.1; 700/280; 701/111
(58) Field of Search ................................ 318/114, 432, 318/433, 568.16, 568.22, 623; 180/65.1–65.8; 310/51; 123/192.1, 192.2; 700/280; 701/102, 110, 111; 74/574

(56) References Cited

U.S. PATENT DOCUMENTS

| 5,772,516 | A | * | 6/1998 | Bonfilio | .......................... 464/68 |
| 6,254,069 | B1 | * | 7/2001 | Muramatsu et al. | ... 267/140.14 |
| 6,336,070 | B1 | * | 1/2002 | Lorenz et al. | .............. 701/102 |
| 6,373,205 | B1 | * | 4/2002 | Weimer et al. | ............. 318/114 |
| 6,405,701 | B1 | * | 6/2002 | Masberg et al. | .......... 123/192.1 |

FOREIGN PATENT DOCUMENTS

| DE | 36 16 768 | 11/1987 |
| DE | 195 32 136 | 3/1997 |
| GB | 2305743 | 4/1997 |

* cited by examiner

Primary Examiner—Burton S. Mullins
Assistant Examiner—Judson H. Jones
(74) Attorney, Agent, or Firm—Cohen, Pontani, Lieberman & Pavane

(57) ABSTRACT

Load cycle oscillations in the drive train of a motor vehicle are reduced by detecting a change in available torque in the drive train, determining the period of a load cycle oscillation, and, at the commencement of the available torque change, applying at least one additional torque pulse, which causes an oscillation in phase opposition to the load cycle oscillation and which lasts half the period of the load cycle oscillation.

19 Claims, 21 Drawing Sheets

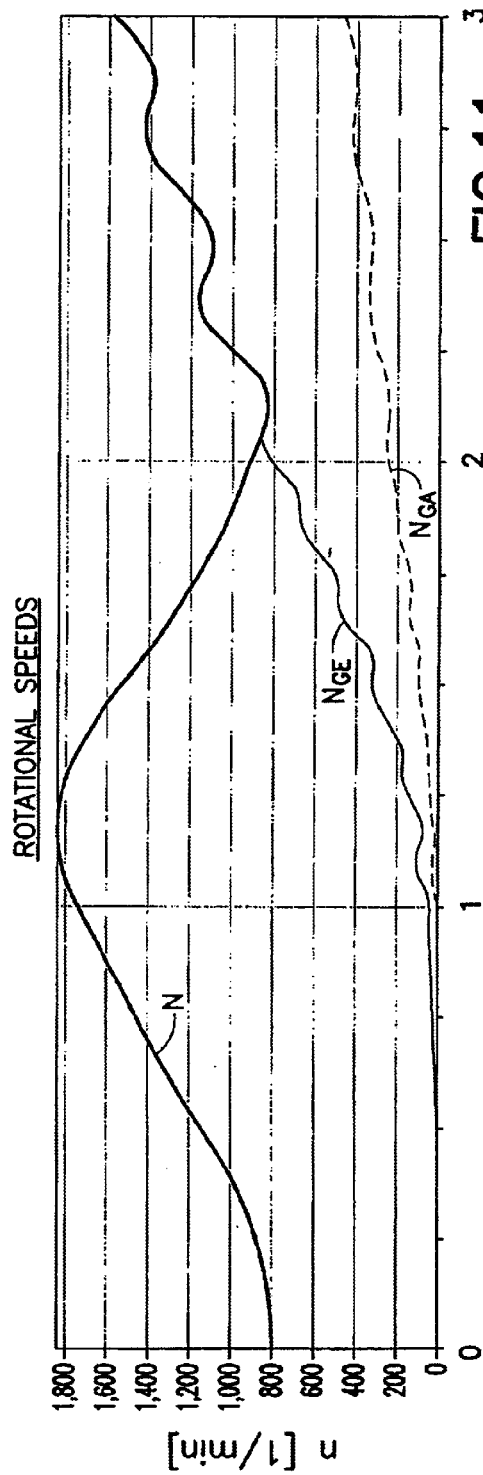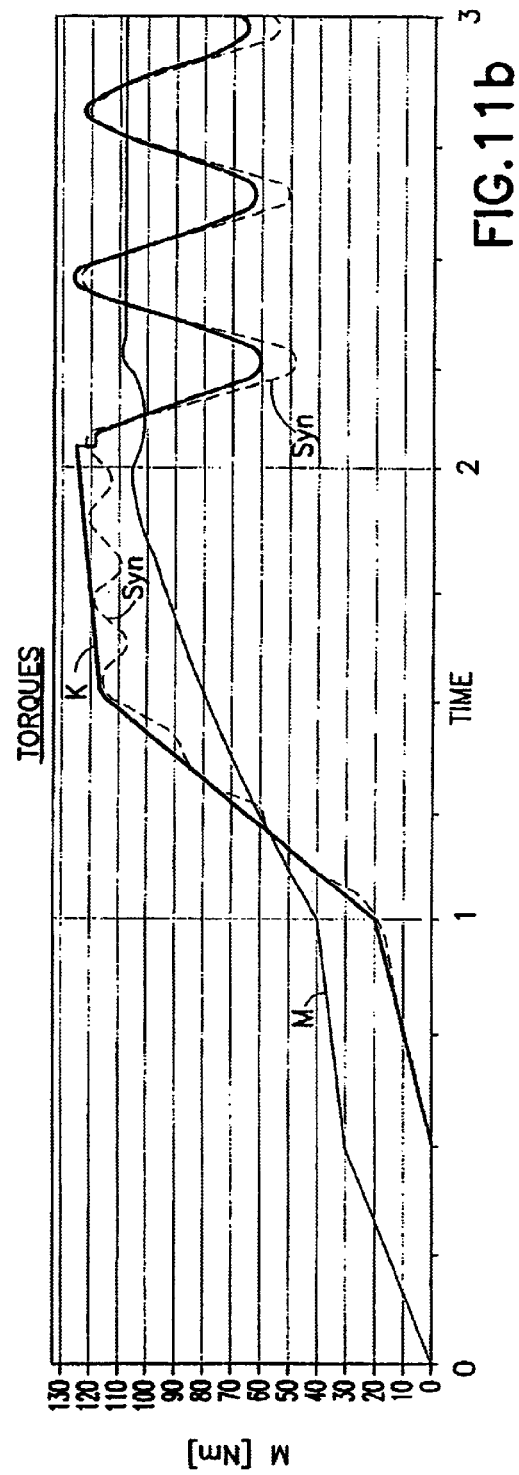

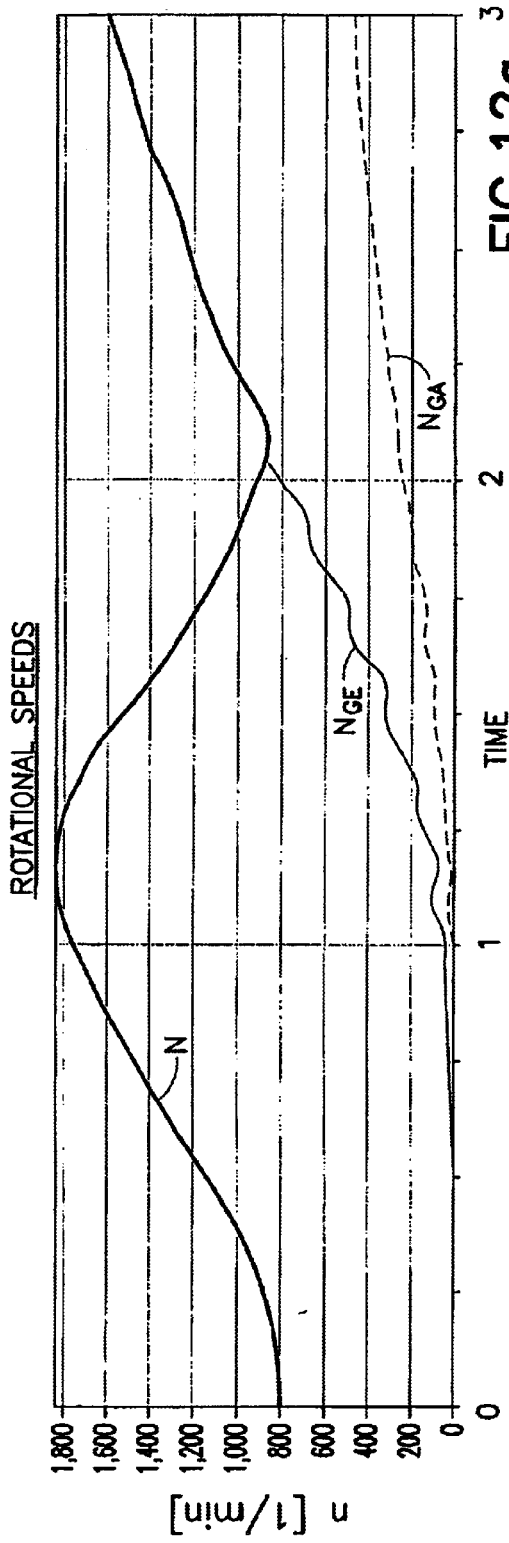
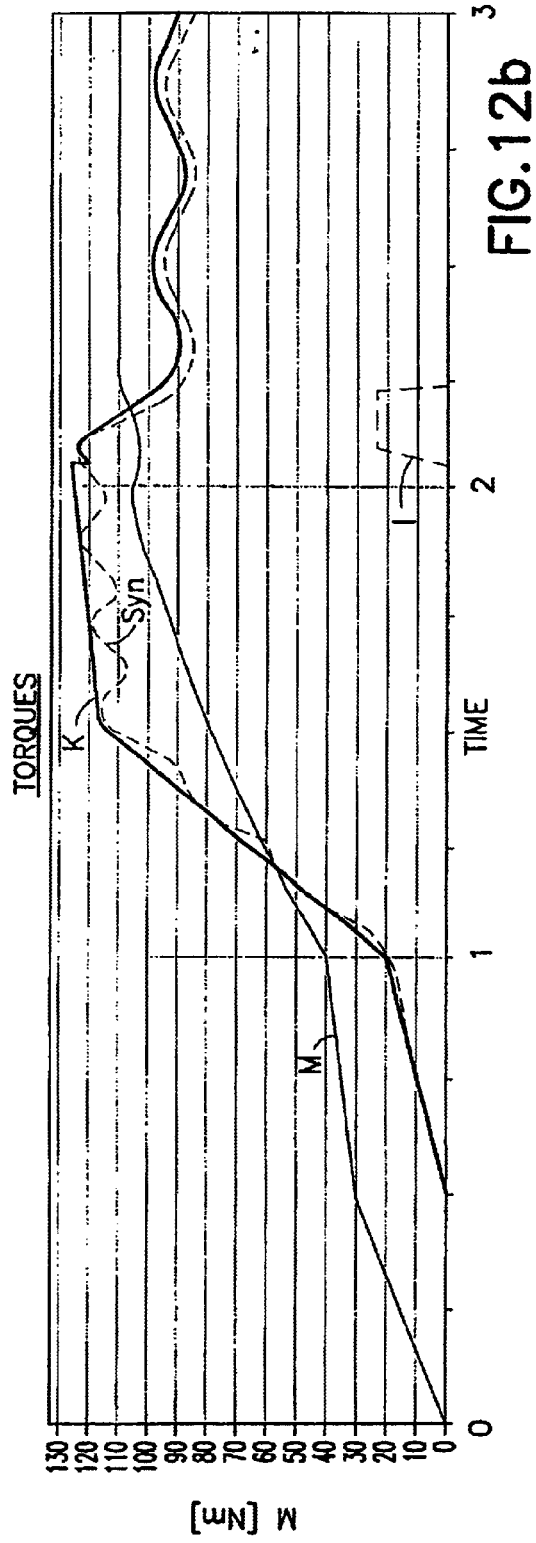

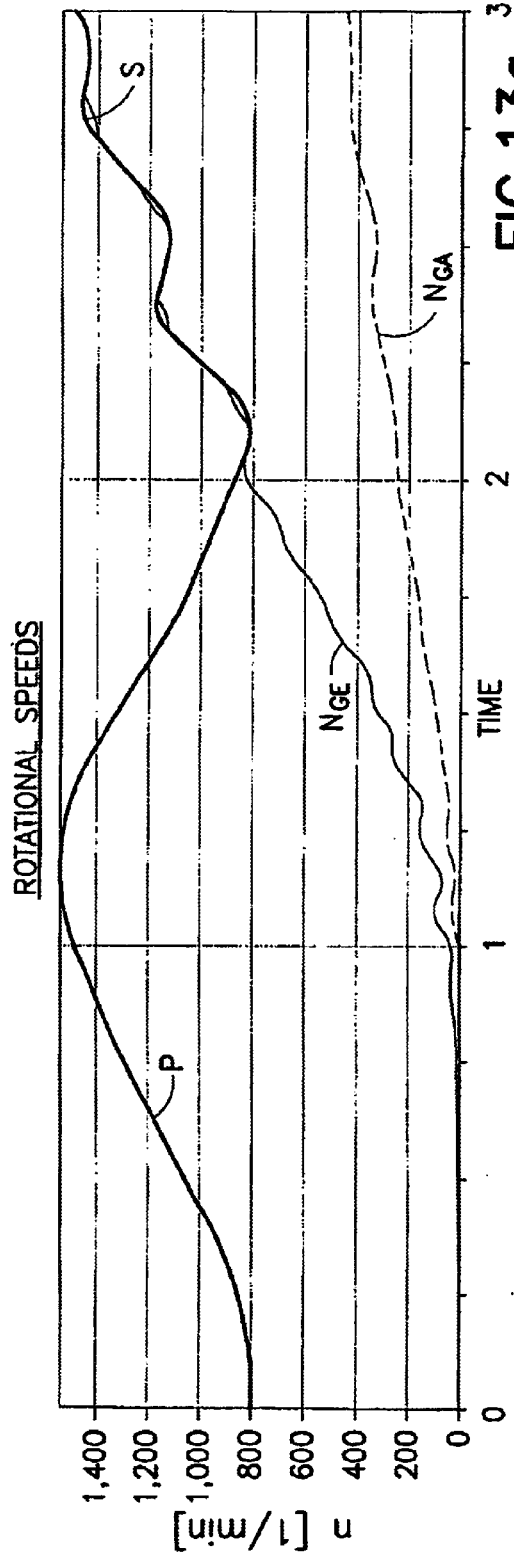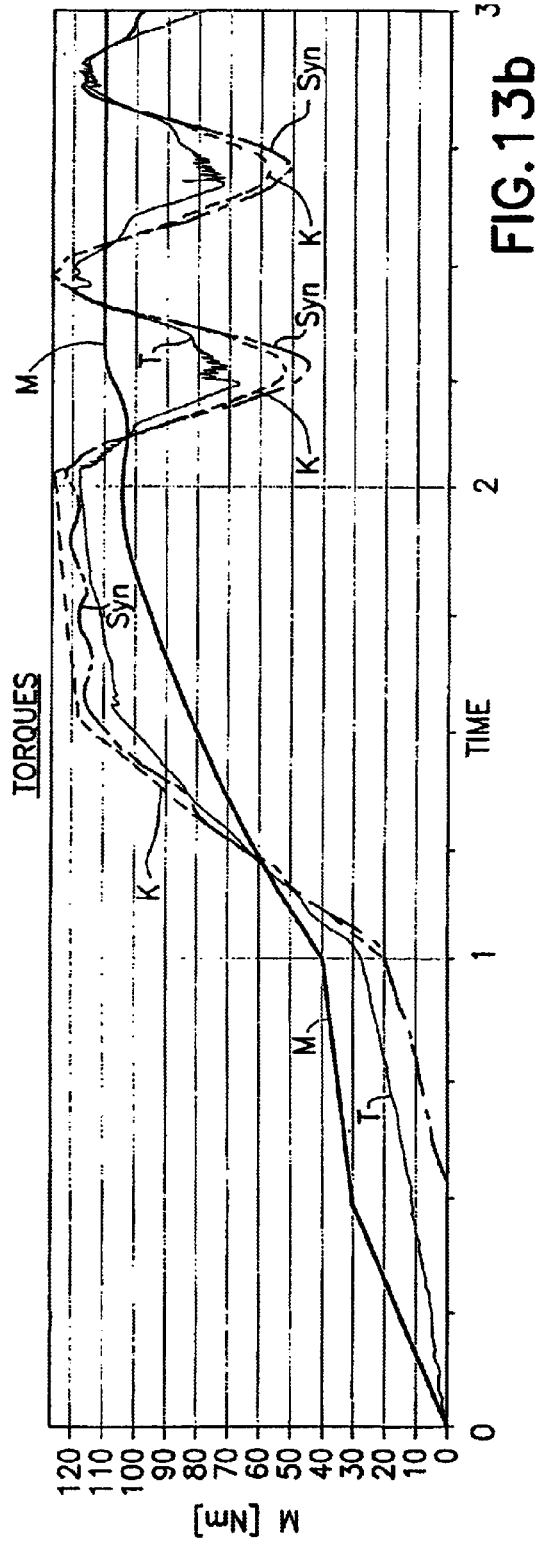

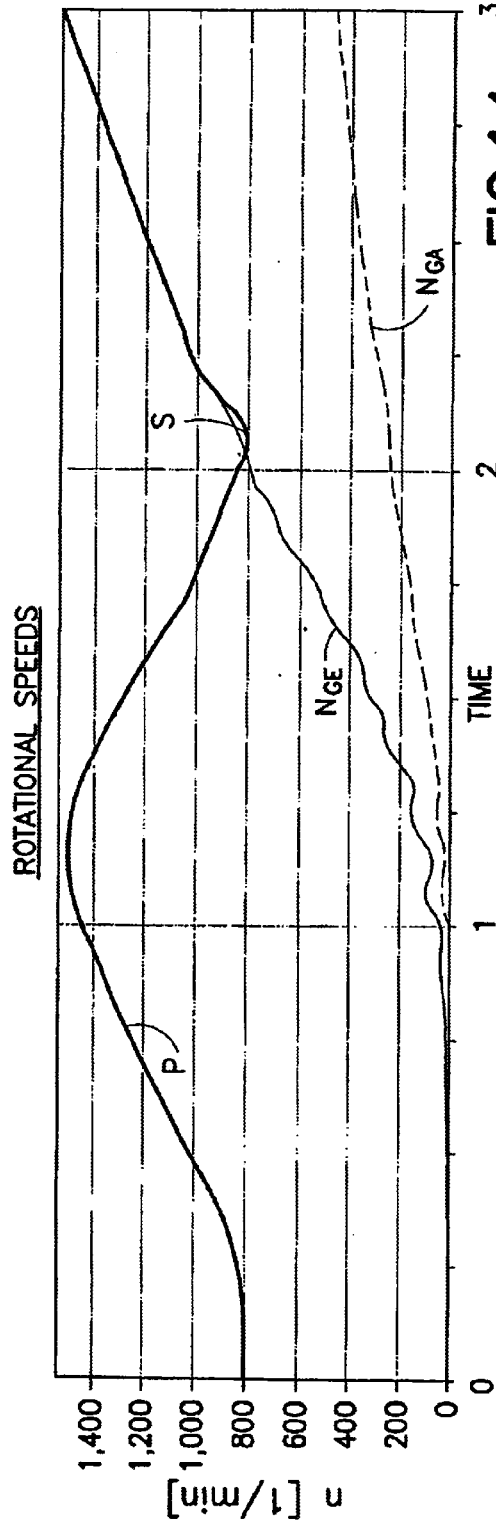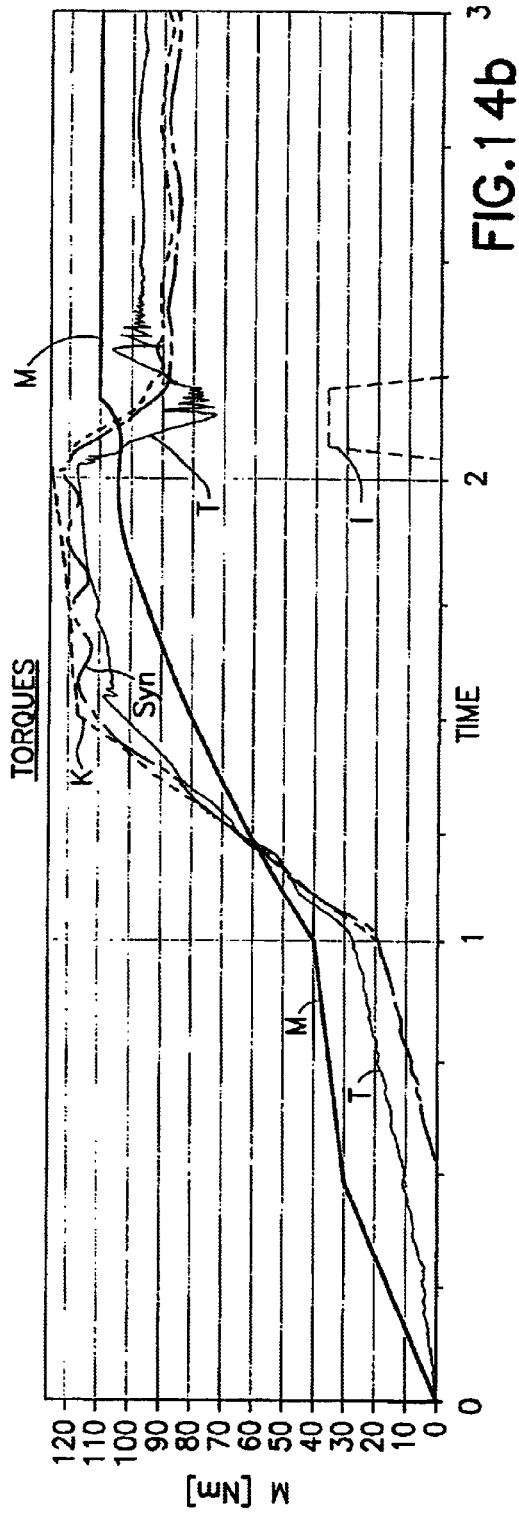

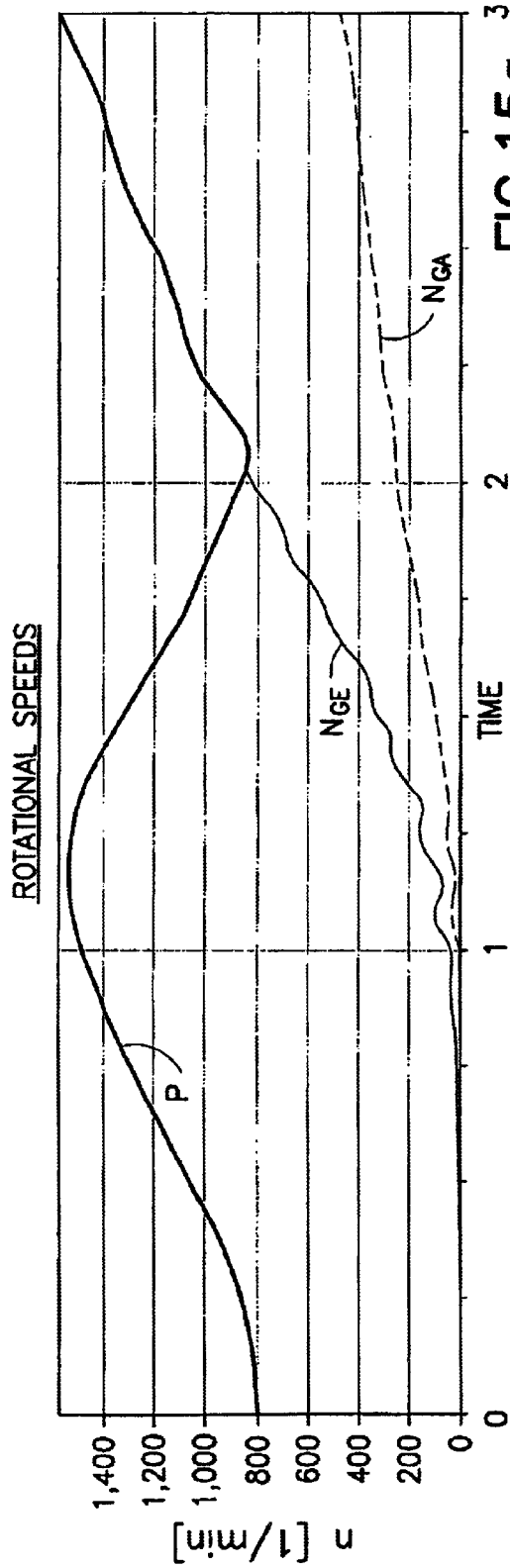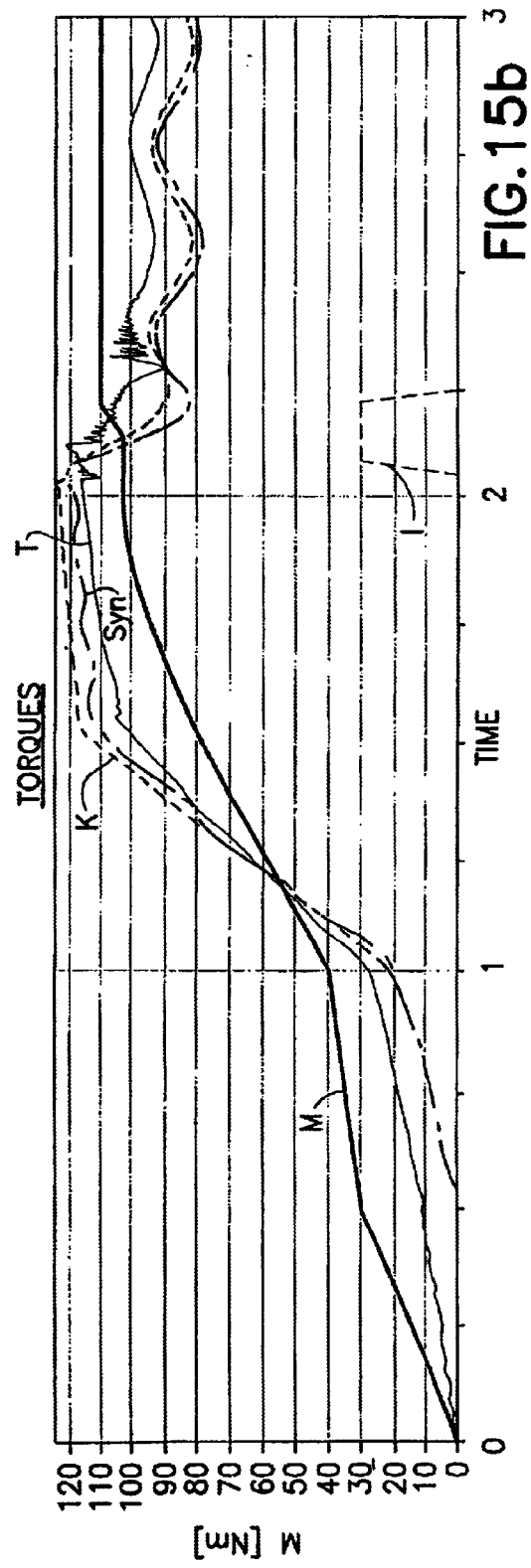

METHOD AND DEVICE FOR THE REDUCTION OF LOAD CYCLE OSCILLATIONS IN THE DRIVE TRAIN OF A MOTOR VEHICLE

BACKGROUND OF THE INVENTION

1. Field of the Invention

The present invention relates to a method for the reduction of load cycle oscillations in the drive train of a motor vehicle which includes detecting a change in available torque in the drive train of a motor vehicle, and determining the period of a load cycle oscillation which is caused by a change in the useful torque. The invention also relates to a device for the reduction of load cycle oscillations in the drive train of a motor vehicle.

2. Description of the Related Art

Changing transmission torques occur in drive trains of vehicles in different driving conditions. A change in the driving condition of a vehicle or motor vehicle, for example an acceleration, requires a change in the drive torque generated by the vehicle engine. Since the drive train of a motor vehicle comprises various masses and elasticities, the drive train of the motor vehicle is excited to load cycle oscillations as a result of this torque change or of this load cycle. The load cycle oscillations are caused by resonance, particularly at the lowest characteristic frequency of the system as a whole. This, with the clutch engaged, is the entire drive train from the vehicle engine as far as the drive wheels.

The load cycle oscillations occur typically in driving conditions in which the change of the transmission or drive torque takes place within a very short time. Driving conditions typical of this are, for example, the load change with a clutch closed, a torque jump after synchronization occurs during starting or gear shifting, or else first ignition during the starting of the engine by means of a two-mass flywheel (TMF).

Various solutions have hitherto been taken into consideration in the prior art in order to avoid or reduce the load cycle oscillations.

In a known solution, a particularly slow torque change takes place. In this case, the torque change acting on the drive train per unit time is kept below a predetermined value, so that the amplitude of the oscillation resulting from this torque change also remains low and the damping members present in the drive train can damp these oscillations to a sufficient extent. The disadvantage of this solution, however, is that the vehicle reacts too sluggishly and experiences a considerable loss of dynamics.

DE 195 36 320, which corresponds to GB 2,305,743, has hitherto proposed a stepped torque change. In this case, a desired torque change is detected and, in order to change the useful torque, an actuator is activated in such a way that the torque change takes place in a plurality of steps. The second step commences with a time delay in respect of the first step, so that the various oscillations generated as a result of the stepped torque change cancel one another out due to destructive interference. In this known method, however, there is the problem that the stepped torque changes usually cannot be controlled very accurately. The same also applies to clutch actuators in which the transmission torque profile is controlled. Furthermore, systems of this kind are mostly unavailable or can be implemented only at a particularly high outlay in design terms.

SUMMARY OF THE INVENTION

The object of the present invention is, therefore, to specify a method and a device, by means of which load cycle oscillations in drive trains can be effectively avoided or reduced.

The method according to the invention for the reduction of load cycle oscillations in the drive train of a motor vehicle comprises in the steps: detecting a change in the available torque in the drive train of the motor vehicle; determining the period of a load cycle oscillation which is caused by a change in the available torque; and at the commencement of the available torque change, applying at least one additional torque pulse which causes an oscillation in phase opposition to the load cycle oscillation, and, in particular, the duration of the torque pulse amounting essentially to half the period of the load cycle oscillation. Load cycle oscillations are thereby effectively reduced, without a loss of dynamics in the vehicle occurring. The available torque may be, for example, a drive torque which is generated by a drive unit, such as, for example, an internal combustion engine or an electric motor. The available torque may, however, also be a transmission torque which is generated, for example, by a clutch arranged in the drive train of the motor vehicle.

Preferably, the magnitude of the torque pulse is in the region of half the magnitude of the useful torque. In this case, the method is designed optimally to allow a particularly effective reduction of the load cycle oscillations.

Preferably, the additional torque pulse is triggered by a logical means at the commencing load cycle.

The additional torque pulse can be applied, for example, by a motor, in particular a rapidly activatable electric motor. Such electric motors may be provided, for example in the form of a starter alternator, in the drive train of the vehicle. It is also possible, however, to apply the additional torque pulse by means of a starter of the motor vehicle. This avoids the need for additional components, costs and weight.

According to a development of the invention, the additional torque pulse is supported on the engine housing or on a rapidly rotating mass, for example via a braking means. It is possible, for example, for braking energy to be stored in the rapidly rotating mass.

Advantageously, torque information from the engine electronics is used for controlling the torque pulse. The control of the torque pulse may also be derived, for example, from a change in rotational speed.

According to the preferred embodiment of the method, the torque pulse is applied to the engine of the motor vehicle. In the case of an engine with a two-mass flywheel, the torque pulse can be applied to a primary part or a secondary part of the engine. When applied to the primary part, the torque pulse has a particularly effective action, that is to say oscillations which may possibly still remain are lower, since the pulse acts nearer to the torque triggering the load cycle or to the average engine torque.

Advantageously, after a first torque pulse, for example with a negative value, a further torque pulse, for example with a positive value, is applied. The load cycle profile is thereby improved even further.

Preferably, during starting or during a gear change, the torque pulse commences at the synchronization time.

Preferably, the torque pulse commences at the first rise in the available torque or engine torque and in opposition to this, in particular during the starting of an engine with a two-mass flywheel. Also, a second additional torque pulse can be applied after a first additional torque pulse, the second torque pulse commencing, for example, one period of the load cycle oscillation later than the first torque pulse. Moreover, three torque pulses may be applied in succession, the middle torque pulse being opposite to the other torque pulses. The effectiveness of the oscillation reduction is thereby increased even further.

The device according to the invention for reducing of load cycle oscillations in the drive train of a motor vehicle comprises means for detecting an available torque change in the drive train of the motor vehicle and means for determining the period of a load cycle oscillation which is caused by a change in the available torque, and, furthermore, a means for generating a torque pulse. The latter means is coupled to the drive train, and a logical means for triggering the torque pulse at the commencing load cycle, the logical means controlling the torque pulse in such a way that the latter lasts, for example, for half the period of the load cycle oscillation and causes an oscillation in phase opposition to the load cycle oscillation. Load cycle oscillations are reduced particularly effectively by the device according to the invention, since, in particular, an accurate control can be carried out.

For example, the means for torque pulse generation is an electric motor which is coupled, for example, to an internal combustion engine.

Advantageously, the means for torque pulse generation is coupled to a primary part and/or to a secondary part of an engine with a two-mass flywheel.

Preferably, the logical means is such that it is designed to control the method described above.

According to another aspect of the invention, a control program for the reduction of load cycle oscillations in the drive train of the motor vehicle is provided, which, for example, is stored on a data carrier or, for example, is available in a network and is capable of being loaded in a control means, with the program steps: detecting an available torque signal in the drive train of a motor vehicle, determining the period of a load cycle oscillation which is caused by a change in the available torque, and generating a control signal for generating a torque pulse, the duration of which amounts essentially to half of the load cycle oscillation and which causes an oscillation opposite to the load cycle oscillation. The invention may also be incorporated in a computer program product, such as, for example, a data carrier.

Advantageously, the control program comprises program steps which are suitable or designed for carrying out the method described above.

According to yet a further aspect of the invention, a control device is provided, which comprises a control program according to the invention or program code means for carrying out the method according to the invention.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

FIGS. 11a and 11b show time graphs for explaining the behavior of the rotational speeds and torques for the starting or gear shifting driving condition in the case of an engine without a two-mass flywheel, the method according to the invention not being used;

FIGS. 12a and 12b show graphs, similar to those of FIGS. 11a and 11b, the method according to the invention being carried out;

FIGS. 13a and 13b show time graphs for explaining the behavior of the rotational speeds and torques for the starting or gear shifting driving condition in the case of an engine with a two-mass flywheel and an electric motor coupled to the secondary part, the method according to the invention not being used;

FIGS. 14a and 14b show graphs, similar to those of FIGS. 13a and 13b, but with the method according to the invention being used;

FIGS. 15a and 15b show graphs, similar to those of FIGS. 14a and 14b, the electric motor being coupled to the primary part;

DETAILED DESCRIPTION OF THE PRESENTLY PREFERRED EMBODIMENTS

The same reference symbols in the various figures relate to essentially identical or functionally identical elements or values.

The invention is described below first by means of the load cycle driving condition, reference being made to FIGS. 1 to 8b.

Figure 1:
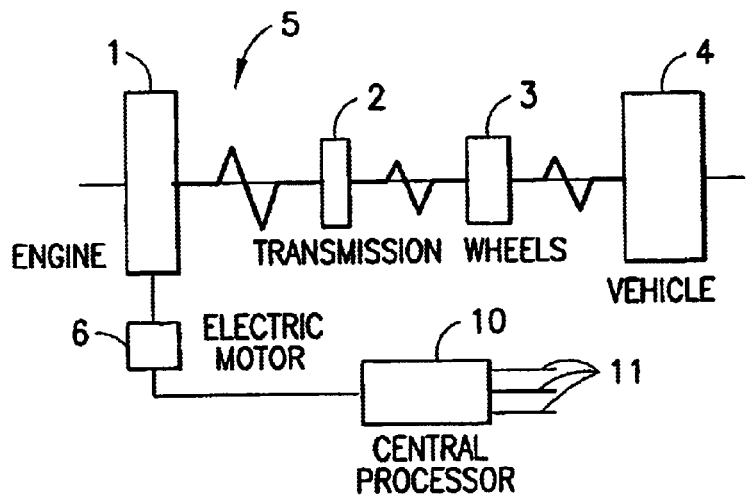
FIG. 1 shows a block diagram of a drive train, with the clutch closed, with an engine without a two-mass flywheel.

FIG. 1 shows a diagrammatic illustration of a block diagram of a drive train for the load cycle driving condition, that is to say with the clutch engaged. An engine 1 or an internal combustion engine is coupled to a transmission 2 which, in turn, is coupled to wheels 3 of a vehicle 4 in order to drive the latter. A torsion damper 5, such as is generally known, is inserted between the engine 1 and the transmission 2. An electric motor 6 serves for applying an additional torque pulse from outside. The electric motor 6 is coupled to the engine 1.

Figure 2A:
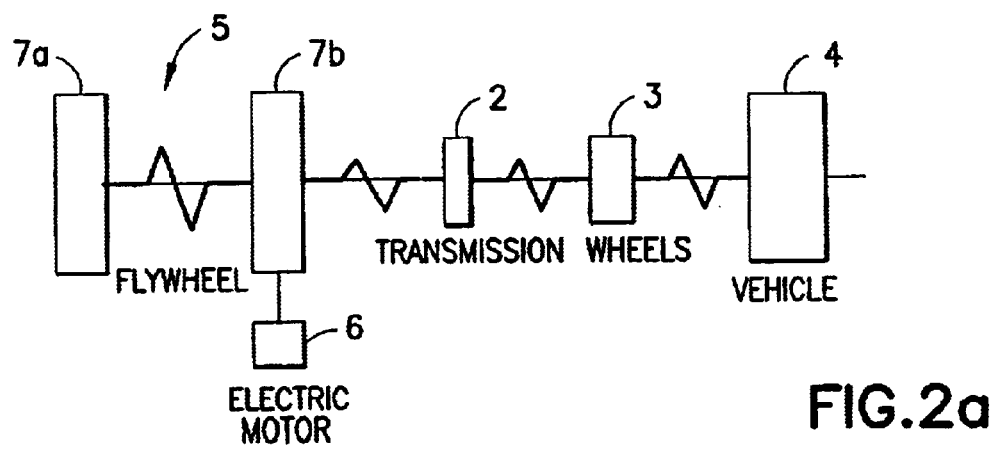
FIGS. 2a and 2b show a block diagram of a drive train, with the clutch closed, with an engine having a two-mass flywheel and an electric motor coupled to the secondary part (FIG. 2a) and primary part (FIG. 2b)

FIG. 2a shows another embodiment of the invention for the load cycle driving condition, but in the case of an engine with a two-mass flywheel. A primary part 7a and a secondary part 7b are present. The transmission 2, the wheels 3 and the vehicle 4 are designed in the block diagram in the same way as in FIG. 1. In the drive train illustrated here, the electric motor 6 is coupled to a secondary part 7b in order to apply the torque pulse.

Figure 2B:
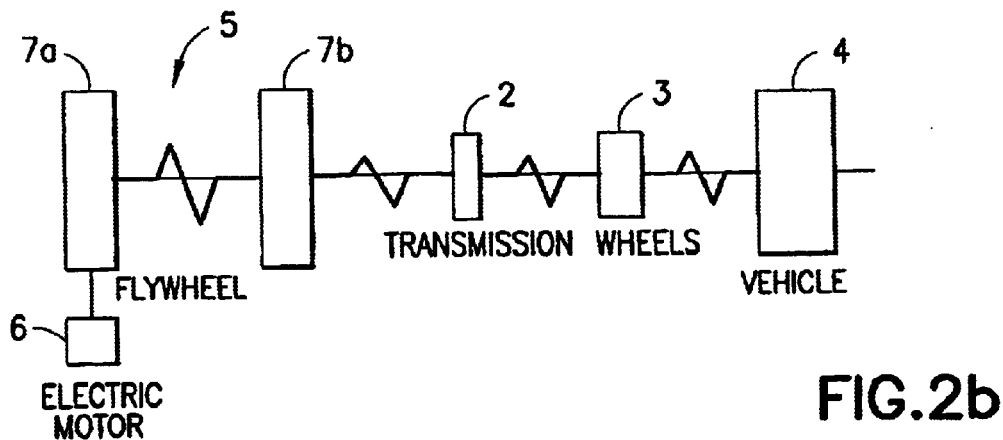

FIG. 2b shows, as a further embodiment of the invention, a drive train with an engine having a two-mass flywheel which is designed in a similar way to that shown in FIG. 2a, the electric motor 6 being coupled to the primary part 7a.

Figure 3A:
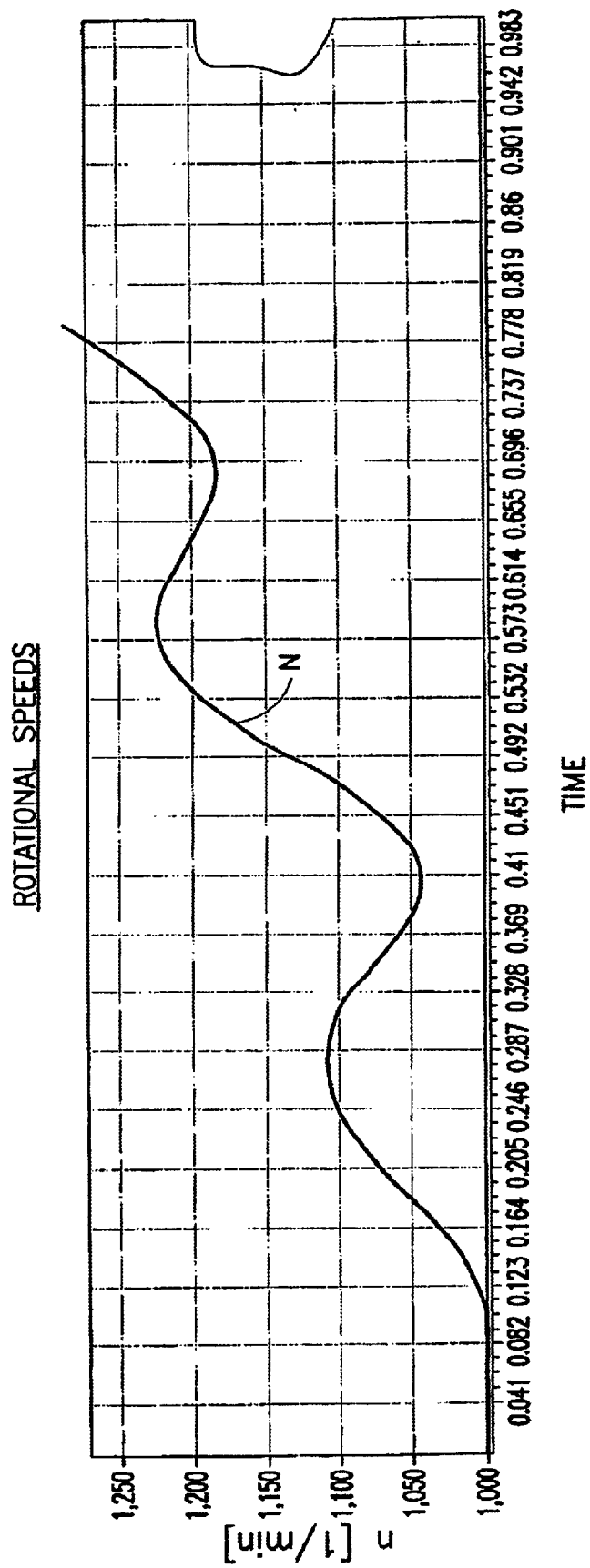
FIGS. 3a and 3b show time graphs for explaining the behavior of the rotational speeds and torques in the load cycle driving condition in the case of an engine without a two-mass flywheel for the situation where the method according to the invention is not used.
Figure 3B:
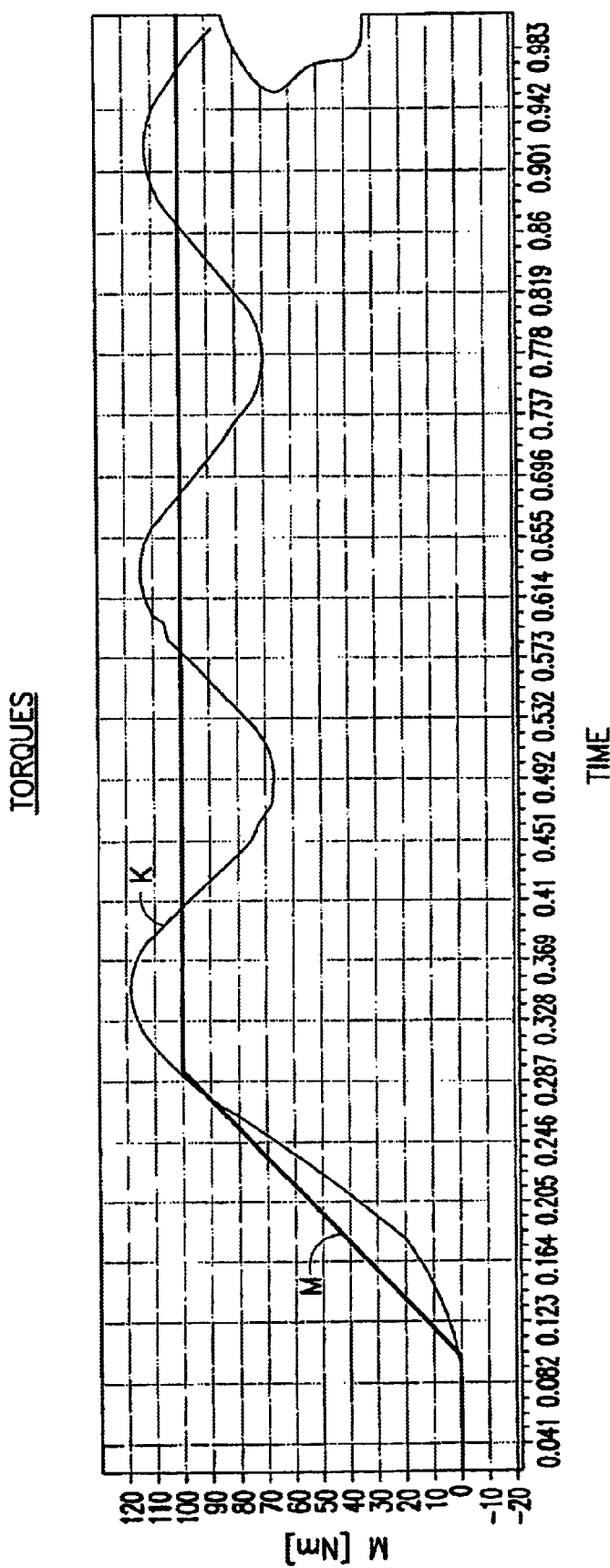

FIGS. 3a and 3b, then, show the rotational speeds and torques during the load cycle in the case of a drive train with an engine without a two-mass flywheel (see FIG. 1). In the case shown here, no additional torque pulse is applied. The average engine torque M rises to 100 Nm within 0.2 s. A load cycle oscillation is thereby triggered, which is shown by the clutch torque K and the engine rotational speed N.

Figure 4A:
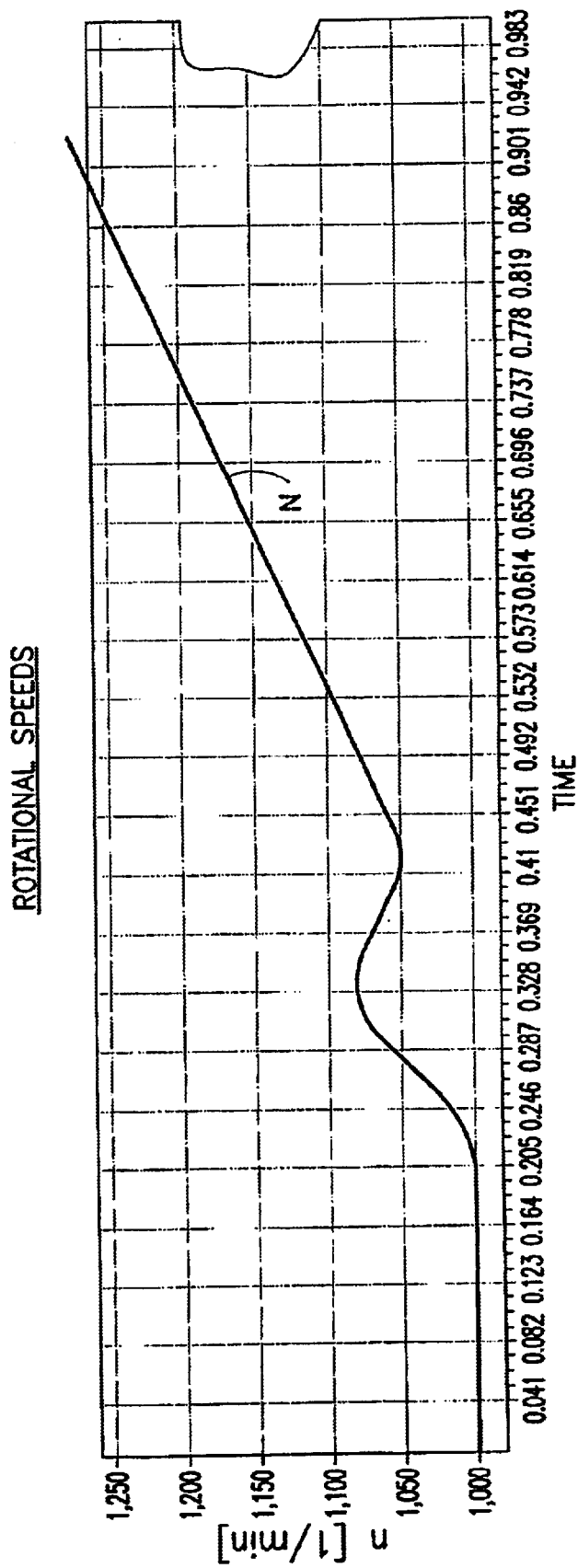
FIGS. 4a and 4b show graphs, similar to those of FIGS. 3a and 3b, for the situation where the method according to the invention is carried out.
Figure 4B:
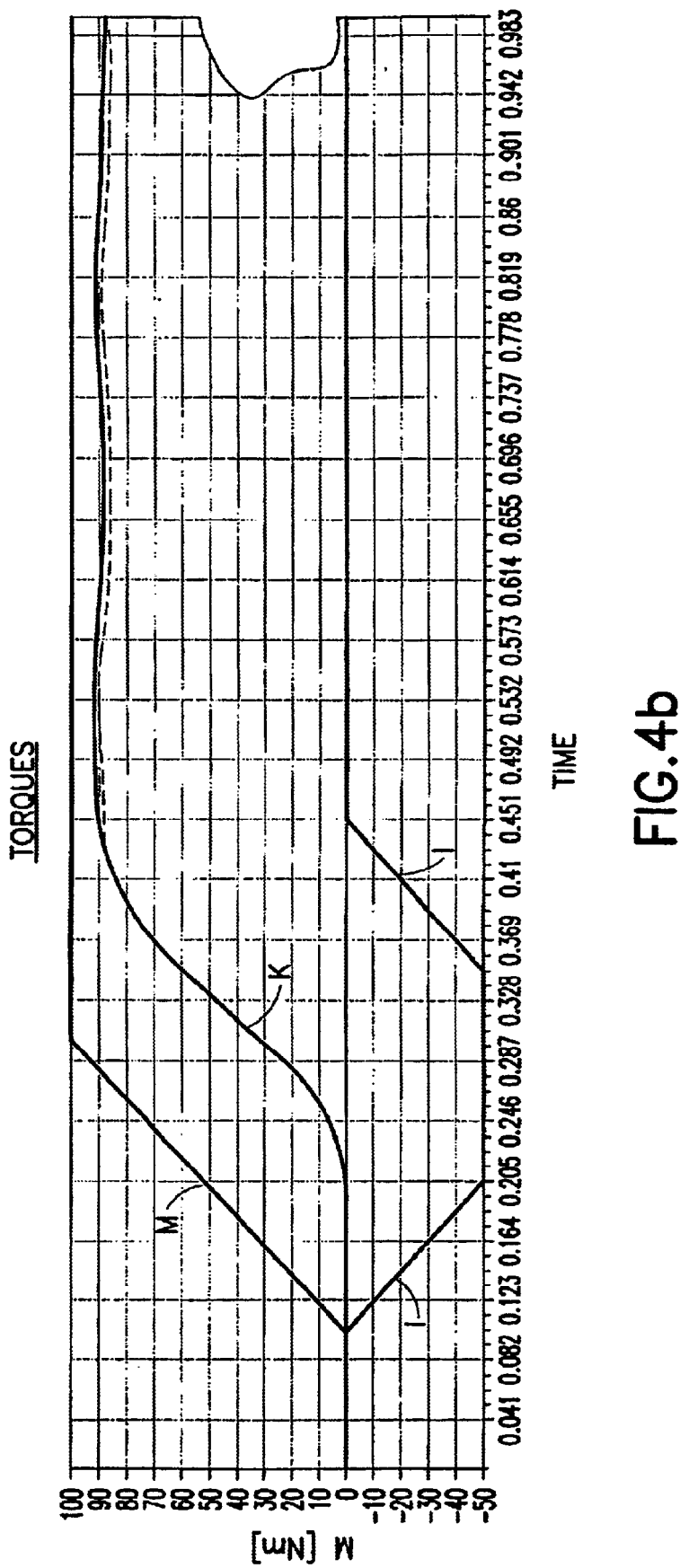

FIGS. 4a and 4b, then, show the behavior of the rotational speeds and torques in the same load cycle, but with the method according to the invention being carried out. In this case, an additional torque pulse I is applied by the electric motor 6 (FIG. 1) simultaneously with the change in the engine torque M. The additional torque pulse has a value of −50 Nm, that is to say it is half the magnitude of the average engine torque M applied and is directed opposite to the latter. The additional torque pulse I has a duration which corresponds to half the period of the load cycle oscillation. For controlling the pulse, for example, torque information from the engine electronics is used. Alternatively, the control of the pulse may also be derived from the change in rotational speed. The period of the load cycle oscillation (also referred to as load change vibration) may be determined, for example, from vehicle condition data such as the throttle position, the engine speed, the road speed, the clutch state, and the engaged gear. A central processor determines the oscillation period based on this information. This is described, for example, in GB 2,305,743 initially mentioned, to which express reference is made.

A central processor 10 is shown schematically in FIG. 1, with inputs 11 for determining the period of the load cycle.

The central processor includes a logic device which controls the torque pulse so that it lasts half the period of the load cycle oscillation. These features have been omitted from other drawings for simplicity.

As a result of the torque pulse additionally applied, the clutch torque K rises continuously to its maximum value and the engine rotational speed N likewise no longer contains any oscillations.

Figure 5A:
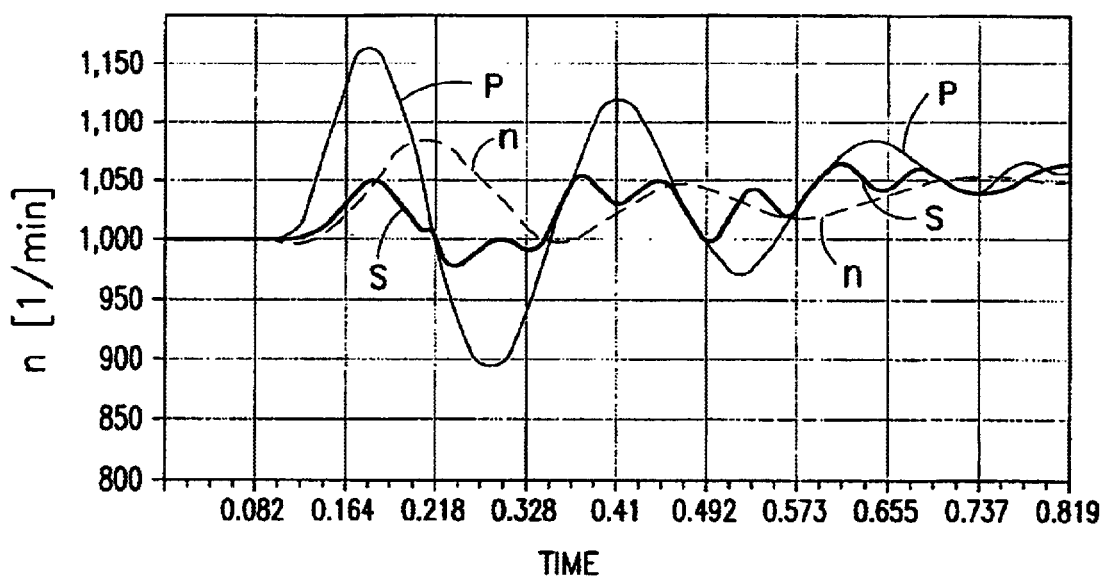
FIGS. 5a and 5b show time graphs for explaining the behavior of the rotational speeds and torques in the load cycle driving condition in the case of an engine with a two-mass flywheel and an electric motor coupled to the secondary part, for the situation where the method according to the invention is not used.
Figure 5B:
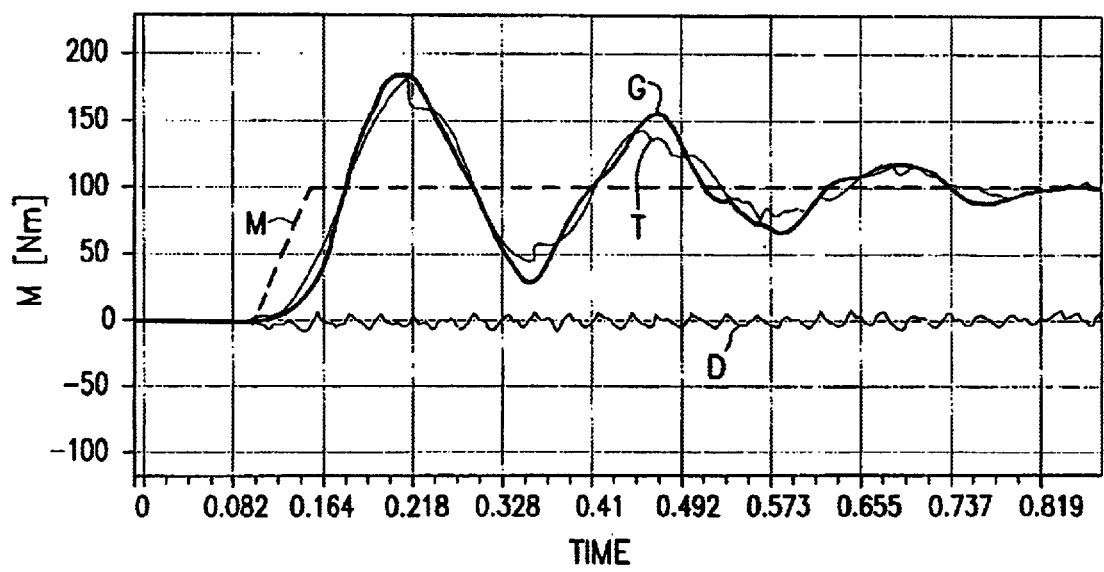

FIGS. 5a and 5b show the rotational speeds and torques for an engine with a two-mass flywheel in the load cycle driving condition (FIG. 2a), but without an additional torque pulse. The average engine torque M is illustrated by broken lines and rises to 100 Nm within a short time. The torque T in the torsion damper of the two-mass flywheel and the torque G in the transmission input shaft thereby undergo load cycle oscillations. The dynamic engine torque D which is excited at the ignition frequency is kept very low in the graph, since it does not influence the load cycle and would otherwise make the graphs unclear. In the condition illustrated here, no additional torque pulse is transmitted by the electric motor 6 according to FIG. 2a which is coupled to the secondary part of the two-mass flywheel. As regards the rotational speeds, considerable load cycle oscillations are exhibited for the dynamic engine torque both at the primary rotational speed P and at the secondary rotational speed S and the imaginary average engine rotational speed n.

Figure 6A:
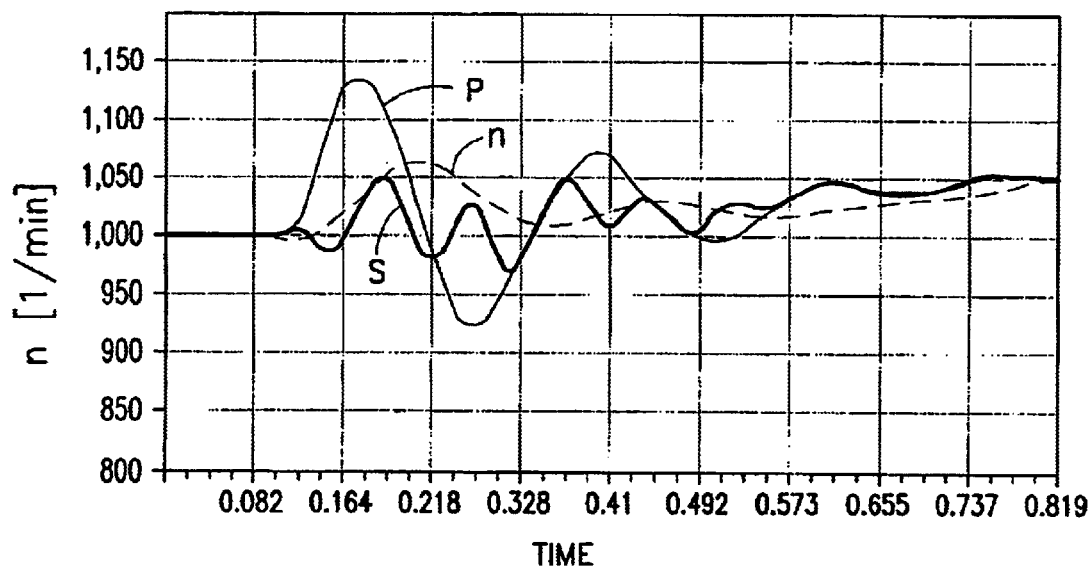
FIGS. 6a and 6b show graphs, similar to those of FIGS. 5a and 5b, for the situation where the method according to the invention is carried out.
Figure 6B:
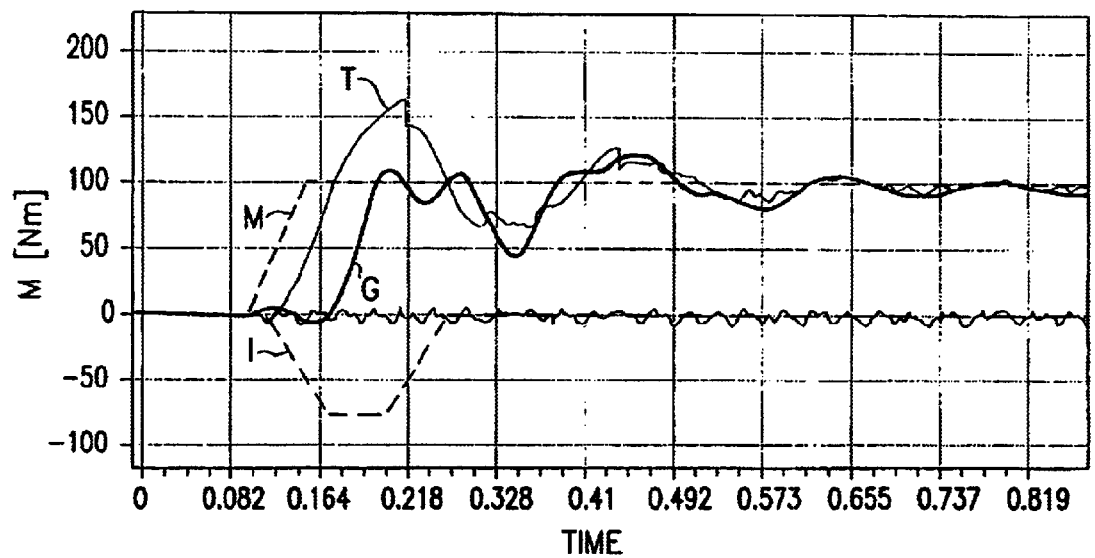

FIGS. 6a and 6b illustrate, then, how, in the case of the engine with a two-mass flywheel and with the electric motor according to FIG. 2a coupled to the secondary part 7b, the load cycle oscillations are reduced by a torque pulse being applied. At the commencement of the load cycle or at the change in the average engine torque M, the additional torque pulse I is applied, which is negative or is directed opposite to the average engine torque M and the duration of which is essentially half the period of the load cycle oscillation. It is shown that the load cycle oscillations, which are exhibited in the rotational speeds and torques, are greatly reduced by the additional torque pulse I.

Figure 7A:
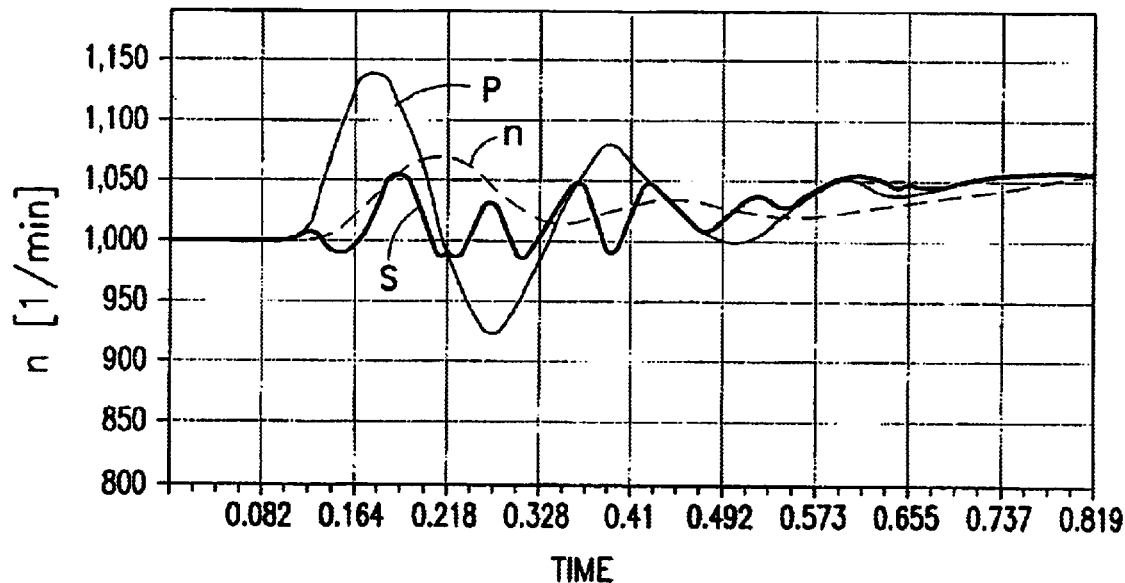
FIGS. 7a and 7b show graphs, similar to those of FIGS. 6a and 6b, 2 torque pulses being applied.
Figure 7B:
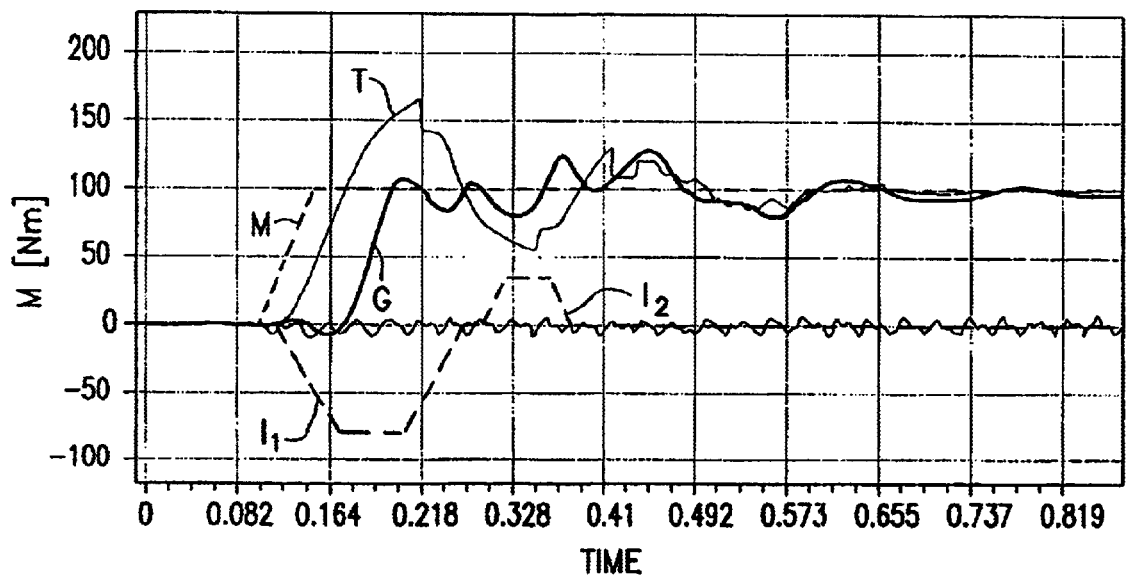

FIGS. 7a and 7b show how the load cycle profile is improved even further by a second pulse with a positive torque. A situation for a load cycle operation for an engine with a two-mass flywheel is likewise illustrated here, the electric motor 6 being coupled to the secondary part 7b (FIG. 2a). Simultaneously with the commencement of the rise in the average engine torque M, a torque pulse I1 directed opposite to the latter is applied by the electric motor 6 (FIG. 2a). After the first torque pulse I1, a second, positive torque pulse I2 is applied. The above-discussed oscillations in rotational speeds and torques are reduced even further as a result.

Figure 8A:
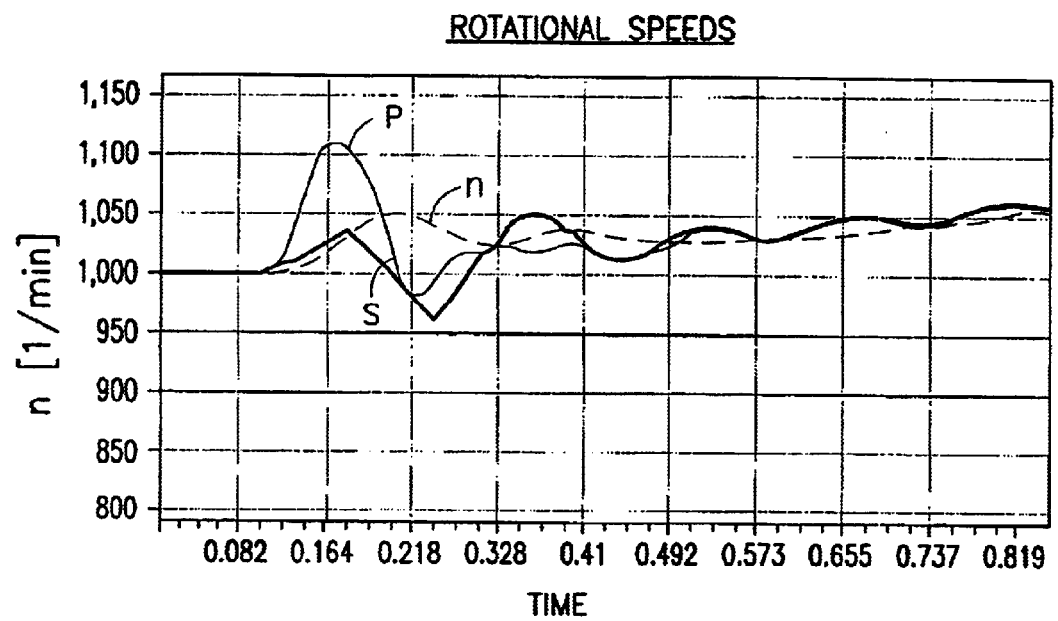
FIGS. 8a and 8b show graphs, similar to those of FIGS. 6a and 6b, but in the case of an electric motor coupled to the primary part.
Figure 8B:
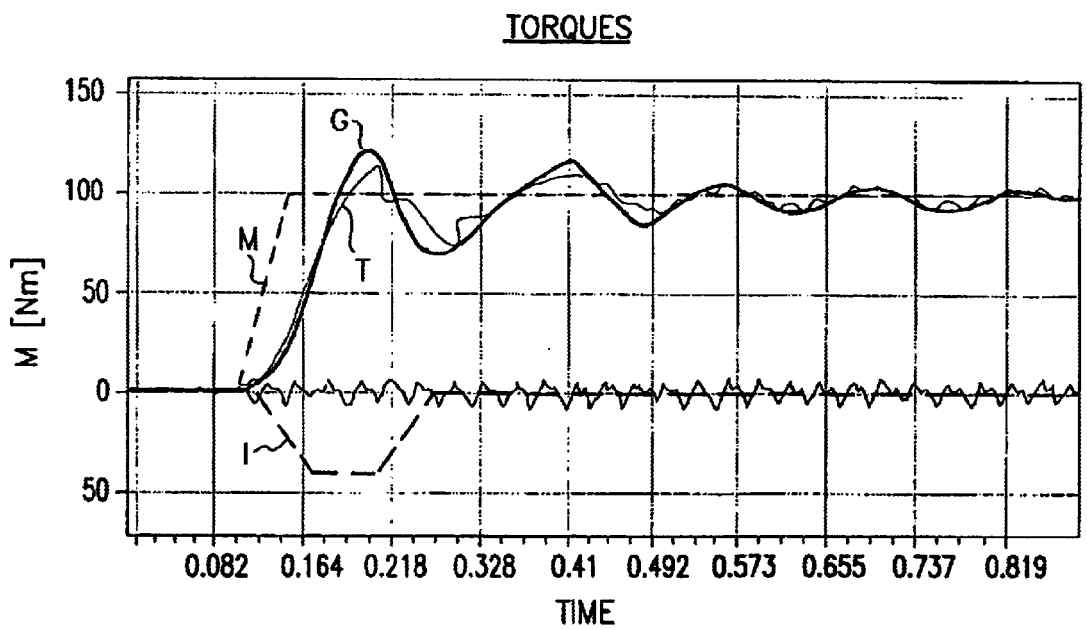

FIGS. 8a and 8b show the profile of the rotational speeds and torques during the load cycle for an engine with a two-mass flywheel, the electric motor 6 now being coupled to the primary part 7a (FIG. 2b). The magnitude of the torque pulse I is lower than in FIGS. 6b and 7b, in which the torque pulse I was applied to the secondary part. Since the pulse I according to FIG. 8b is applied to the primary part 7a, it acts nearer to the torque triggering the load cycle or to the average engine torque M. As a result, the remaining oscillations in rotational speeds and torques are lower than during application via the secondary part 7b. That is to say, according to this embodiment of the invention, the action of the torque pulse I is even more effective.

The starting or gear change driving condition is described below. Reference is made, in this case, to FIGS. 9 to 15b.

Figure 9:
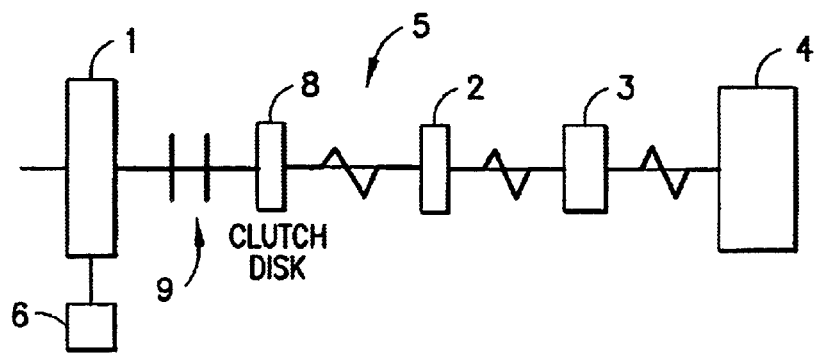
FIG. 9 shows a block diagram of a drive train for the starting or gear shifting driving condition for an engine without a two-mass flywheel.

FIG. 9 shows, as a block diagram, a drive train with an engine without a two-mass flywheel in the starting or gear change driving condition. A clutch disk 8 is located between the engine 1 and the transmission 2 and a clutch transmission torque 9 occurs. The torsion damper 5 acts between the disk 8 and the transmission 2. An electric motor 6 is coupled to the engine 1.

FIGS. 11a and 11b show, for this purpose, the rotational speeds and torques during the starting operation of an engine without a two-mass flywheel, without using the method according to the invention. The rotational speed ratio between the rotational speed $N_{GE}$ at the transmission input and the rotational speed $N_{GA}$ at the transmission output in FIG. 11a corresponds to the change into first gear. The engine torque M, the clutch torque K and also the torque in the transmission Syn or in the synchronizing means are illustrated in the graph according to FIG. 11b. In the slip range after about one second, the clutch torque K is higher than the engine torque M, thus leading to pressure on the engine. Pressure on the engine before synchronization increases the torque jump at the average clutch torque K after synchronization. The torque jump leads to the load cycle oscillations visible in the rotational speed profile and torque profile.

FIGS. 12a and 12b, then, show how the load cycle oscillations are reduced by a torque pulse being applied according to the invention. In this case, an individual pulse I with half the duration of the load cycle oscillation is applied by the electric motor 6 (FIG. 9). The pulse I commences at the synchronization time and thereby suppresses the load cycle oscillations. Since the pulse I is applied to the internal combustion engine or engine 1, it is transferred, only reduced, to the clutch. In order to compensate this reduction, the pulse I is increased, so that the pulse effective on the clutch corresponds to half the torque jump at the clutch. As a result, the load cycle oscillations in the rotational speeds and torques are markedly reduced.

Figure 10A:
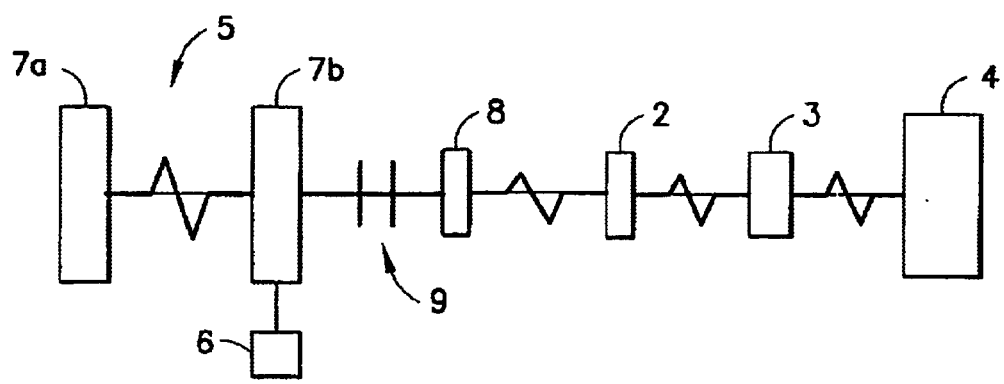
FIGS. 10a and 10b show block diagrams, similar to that of FIG. 9, but for an engine with a two-mass flywheel and an electric motor coupled to the secondary part (FIG. 10a) and to the primary part (FIG. 10b)

FIGS. 13a and 13b show the rotational speeds and torques during a starting operation in a drive train with a two-mass flywheel, the electric motor 6 being coupled to the secondary part 7b. A corresponding block diagram of the drive train is shown in FIG. 10a. The torsion damper 5 acts between the primary part 7a and the secondary part 7b and the clutch transmission torque 9 acts between the secondary part 7b and the disk 8.

In the case of the rotational speeds and torques illustrated in FIGS. 13a and 13b, no additional torque pulse occurs. FIG. 13b illustrates the torsion damper torque in the two-mass flywheel T in addition to the engine torque M, the clutch torque K and the torque in the transmission Syn. The moment of inertia determining the magnitude of the torque jump is the sum of the primary and secondary moments of inertia. Since this value is higher in the simulation model used here than the engine moment of inertia (including flywheel and thrust plate) in the simulation model without a two-mass flywheel, a higher torque jump and therefore more pronounced oscillations of the load cycle moment occur.

By contrast, FIGS. 14a and 14b show a sharp reduction in the load cycle oscillations by the torque pulse I applied by means of the electric motor 6 which is coupled to the secondary part 7b (FIG. 10a). The suppression of the load cycle oscillations is particularly effective here, since the torque jump and the torque pulse both act on the secondary part 7b.

Figure 10B:
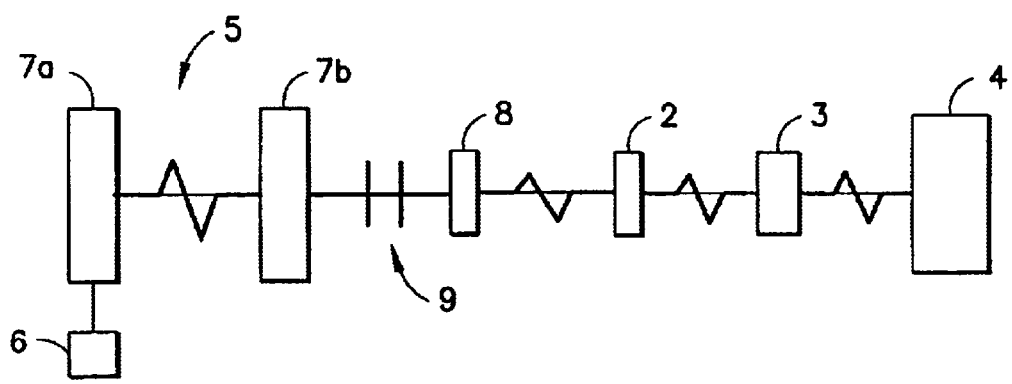

FIGS. 15a and 15b show the rotational speed and torque profiles for an engine with a two-mass flywheel, although the electric motor 6 is coupled to the primary part 7a. A block diagram of this embodiment of the invention in the starting or gear change driving condition is shown in FIG. 10b.

Here, too, to reduce the load cycle oscillations, an additional torque pulse I is applied by the electric motor 6 coupled to the primary part 7a. Here, however, the suppression of the load cycle oscillations is somewhat less effective, since the torque jump and the torque pulse act on different moments of inertia.

The engine starting condition is described below. Reference is made, for this, to FIGS. 16a to 21b.

In the case of an engine without a two-mass flywheel, no load cycle oscillations arise in this condition.

Figure 16A:
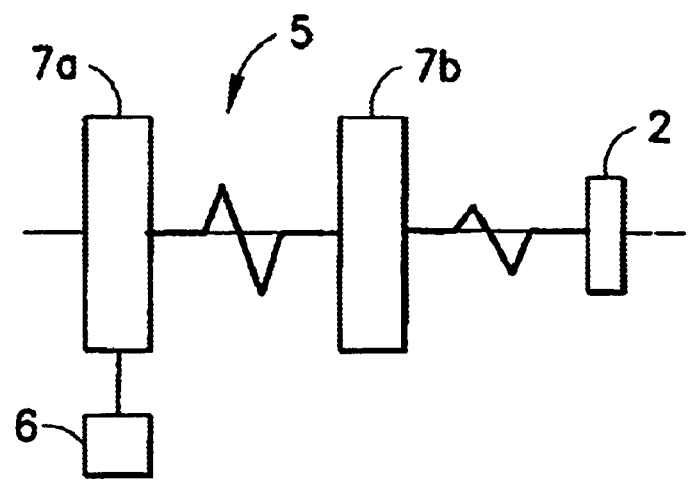
FIGS. 16a and 16b each show a block diagram of a drive train for the engine starting condition in the case of an engine with a two-mass flywheel and an electric motor coupled to the primary part (FIG. 16a) and an electric motor coupled to the secondary part (FIG. 16b)
Figure 17A:
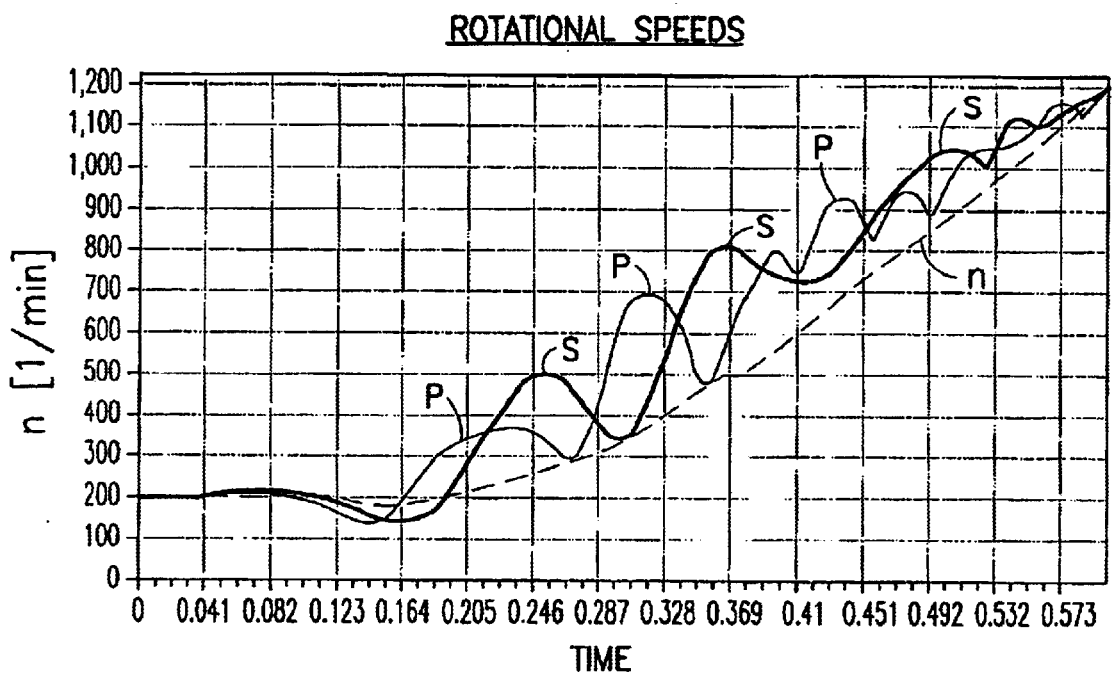
FIGS. 17a and 17b show time graphs for explaining the behavior of the rotational speeds and torques for the engine starting condition in the case of an engine with a two-mass flywheel and an electric motor coupled to the primary part, for the situation where the method according to the invention is not used.
Figure 17B:
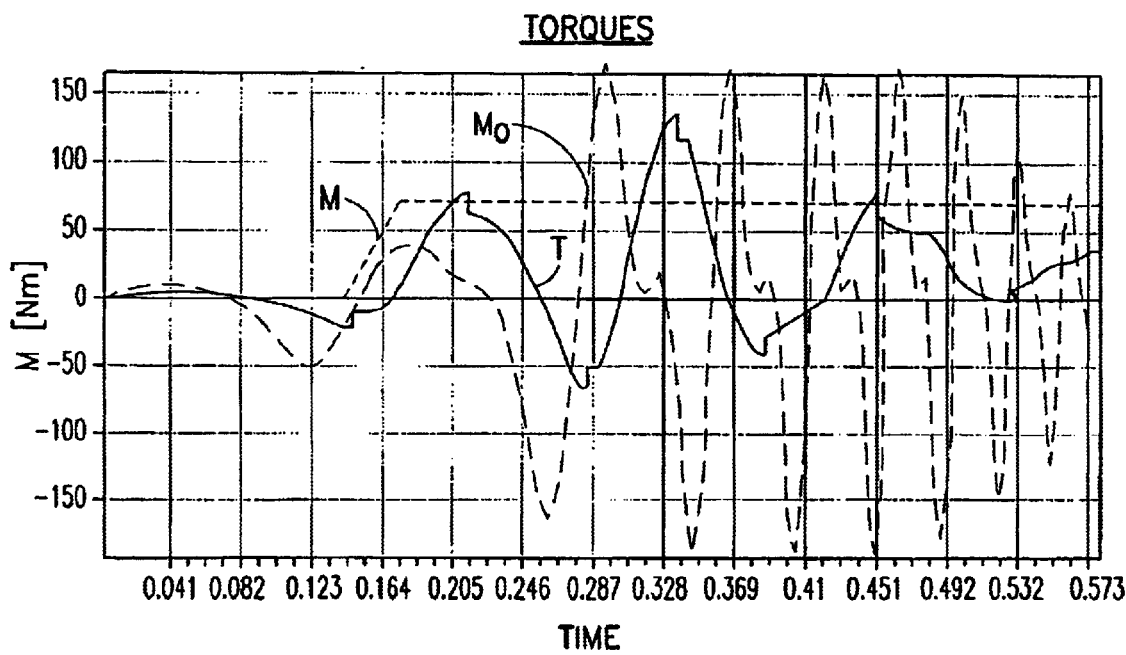

FIG. 16a shows a block diagram of the drive train in the engine starting condition in the case of an engine with a two-mass flywheel, the electric motor 6 being coupled to the primary part 7a. The secondary part 7b is coupled to the transmission 2. Between the primary part 7a and the secondary part 7b is located the torsion damper 5. FIGS. 17a and 17b show the starting of the engine for this system with a two-mass flywheel. The characteristic frequency of the system is just above the ignition frequency at the rotational speed of the starter. In after only the second ignition, the characteristic frequency range is markedly exceeded. With the first ignition, the engine generates an average engine torque M and a higher dynamic torque $M_D$ with ignition frequency. The characteristic frequency is excited with a rapid rise in the average engine torque M and a maximum of two ignition pulses. There is therefore no typical resonance which could be reduced particularly effectively by a torque profile controlled with ignition frequency.

Figure 18A:
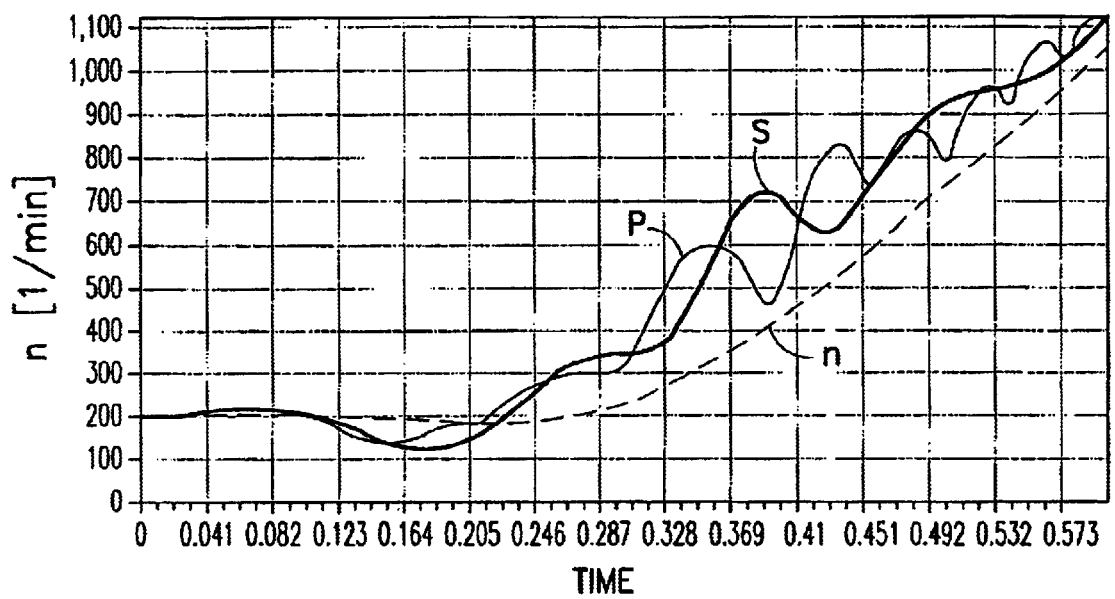
FIGS. 18a and 18b show graphs, similar to those of FIGS. 17a and 17b, but with the method according to the invention being carried out.
Figure 18B:
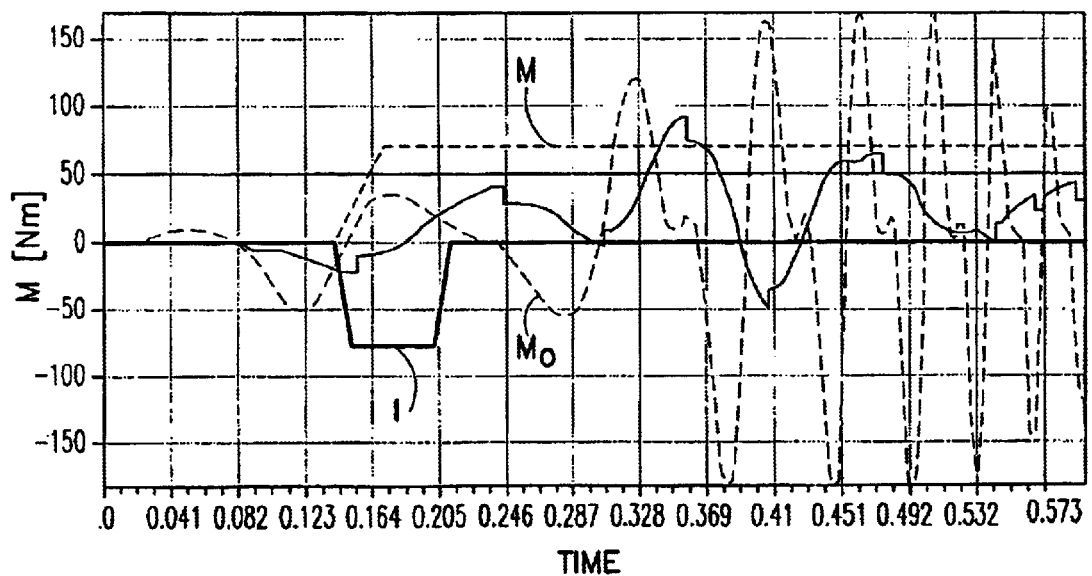

FIGS. 18a and 18b, then, show the use of the method according to the invention in this case. Together with the first rise in the engine torque M, a torque pulse I commences, which is directed opposite the rise in the engine torque M. The pulse duration of the pulse I corresponds to half the period of the characteristic frequency. The torque pulse I is applied to the primary part 7a according to FIG. 16a by the electric motor 6. The oscillations in the rotational speed profiles or torques are markedly reduced.

Figure 19A:
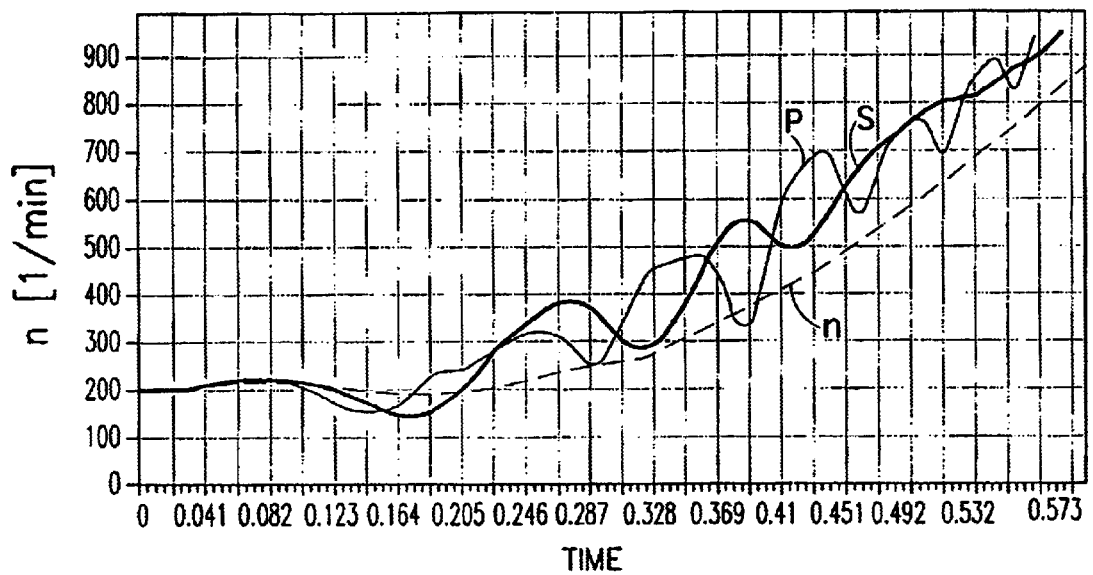
FIGS. 19a and 19b show graphs, similar to those of FIGS. 18a and 18b, 2 torque pulses being applied.
Figure 19B:
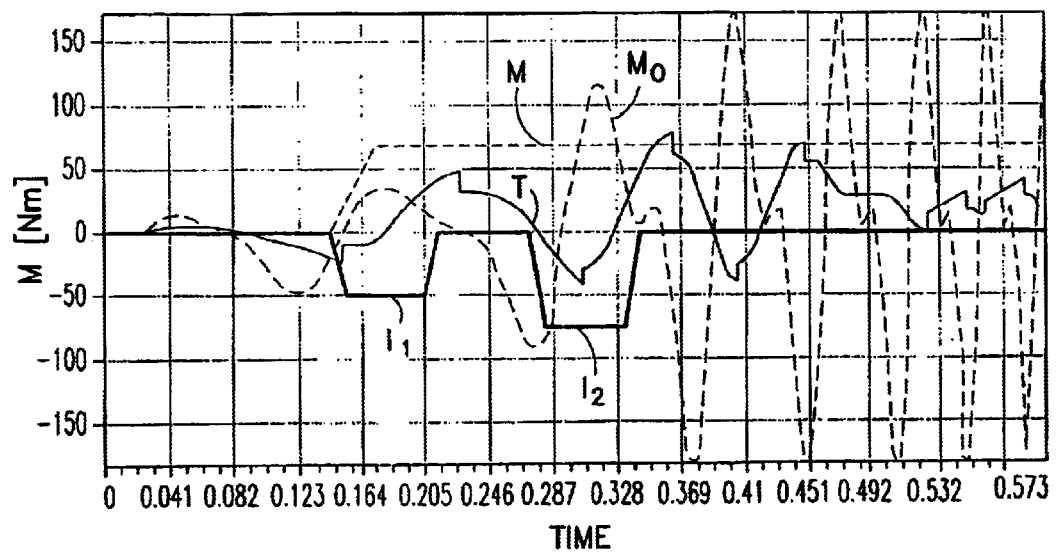

The rotational speeds and torques according to FIGS. 19a and 19b correspond largely to those of FIGS. 18a and 18b, but, here, two torque pulses I1 and I2 are applied in succession. The second torque pulse I2 follows the commencement of the first torque pulse I1 after a period of the load cycle oscillation. The load cycle oscillations in the rotational speeds and torques are thereby reduced even more effectively.

Figure 20A:
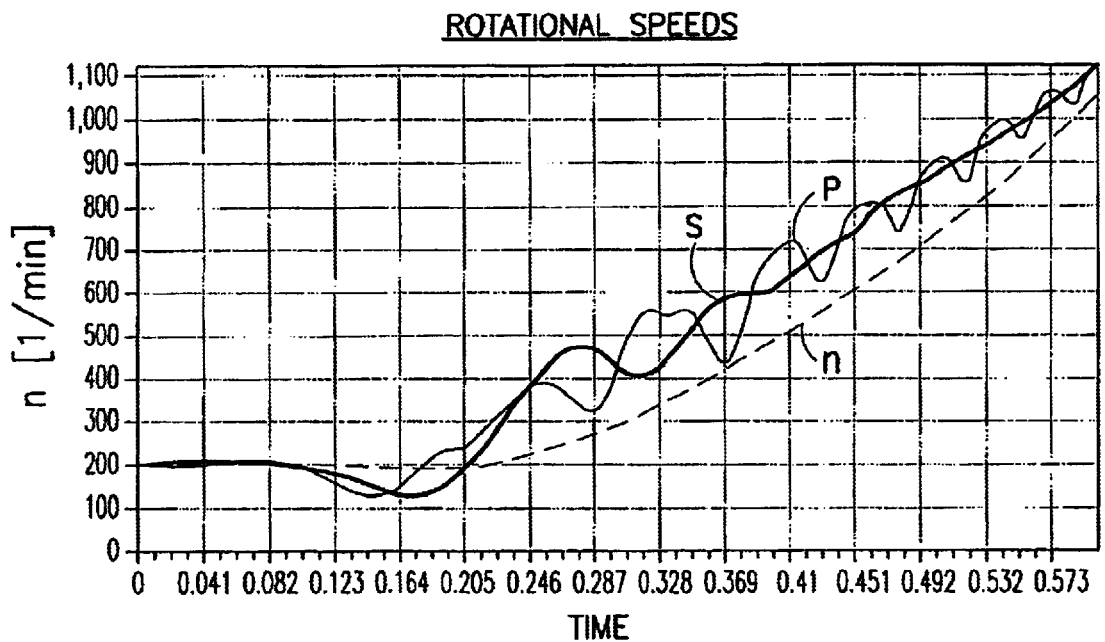
FIGS. 20a and 20b show graphs, similar to those of FIGS. 19a and 19b, 3 torque pulses being applied.
Figure 20B:
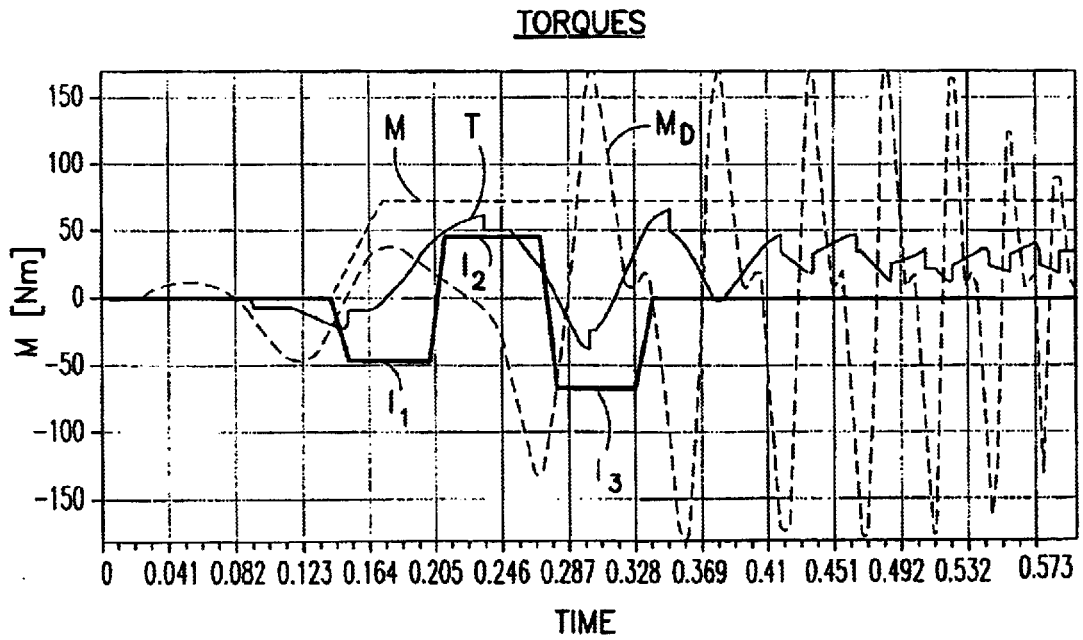

The rotational speed and torque profiles shown in FIGS. 20a and 20b indicate the action of three torque pulses I1, I2, I3 on the load cycle oscillations. With the rise in the average engine torque M, the first torque pulse I1 commences, which has a negative value and lasts half a period. Immediately after the end of the first torque pulse I1, a second torque pulse I2 having a positive value is applied. Directly after the second torque pulse I2, the third torque pulse I3 commences, which again has a negative value. All three torque pulses I1, I2, I3 have a duration of half the period of the load cycle oscillation. The load cycle oscillations are markedly reduced, this becoming particularly clear, for example, from the rotational speed S of the secondary part and from the torque T present on the torsion damper.

Figure 16B:
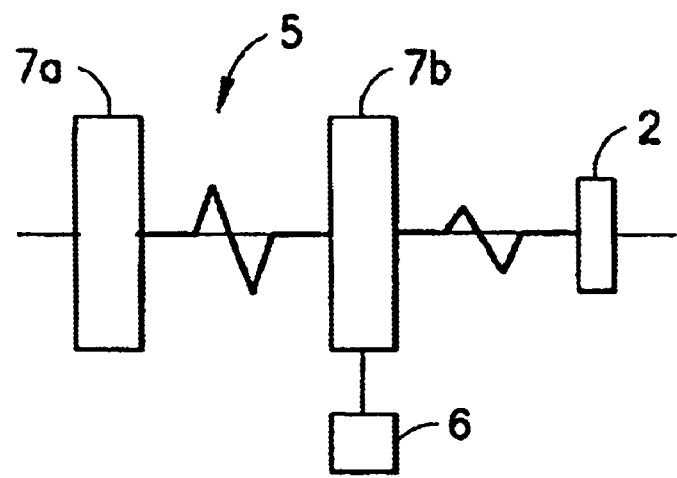
Figure 21A:
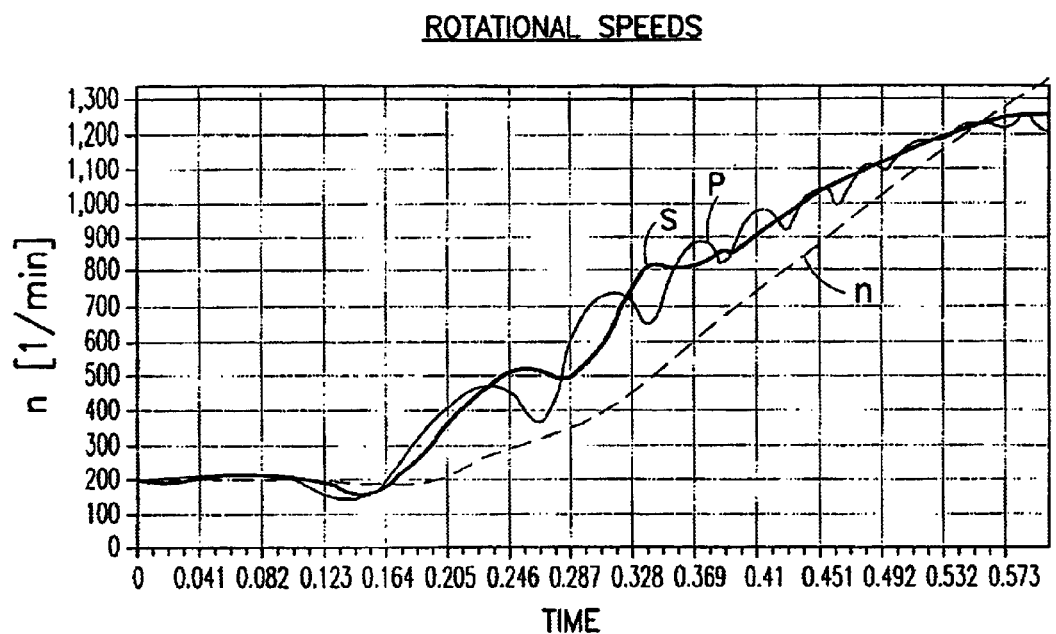
FIGS. 21a and 21b show graphs, similar to those of FIGS. 20a and 20b, the electric motor being coupled to the secondary part and 2 torque pulses being applied.
Figure 21B:
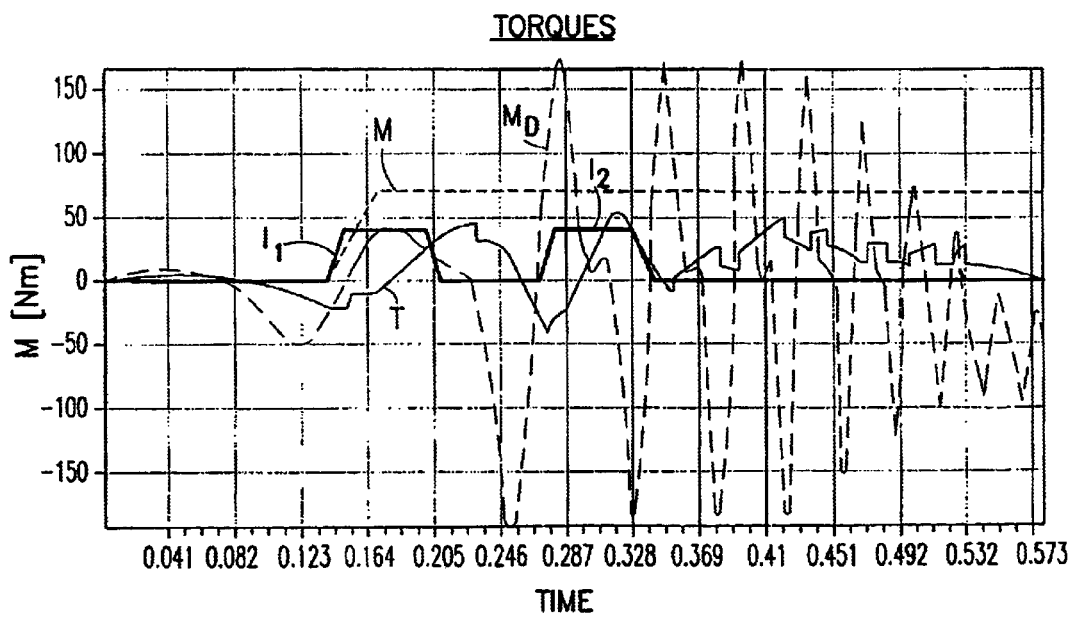

FIGS. 21a and 21b show the reduction in the load cycle oscillations by an electric motor coupled to the secondary part 7b in the engine starting condition. The corresponding block diagram is illustrated in FIG. 16b. The first torque pulse I1 commences with the rise in the average engine torque M. The pulse magnitude is approximately half the pulse magnitude of the average engine torque M. The pulse duration amounts to half the period. A full period after the commencement of the first torque pulse I1, a second torque pulse I2 commences, the pulse magnitude of which is exactly the same as the pulse magnitude of the first torque pulse and which likewise lasts half the period of the torsional oscillation. The reduction in the load cycle oscillations becomes clear from the rotational speeds of the primary part P and of the secondary part S and from the average rotational speed n. In particular, the amplitude of the oscillation or torque T present on the torsion damper is also reduced.

Overall, in the present invention, a marked reduction in the load cycle oscillation is brought about by the application of an external torque pulse which causes an oscillation in phase opposition. Consequently, after the load cycle, the entire system does not execute any or executes only slight oscillations, as shown by the simulation models illustrated in the figures. The invention was described above on the basis of the typical driving conditions of a load cycle with the clutch engaged, a torque jump after the occurrence of synchronization during starting or gear shifting and first ignition during the starting of the engine in a system with a two-mass flywheel. In addition to these typical examples, however, other conditions in which the method according to the invention can be used are also possible. In particular, the application of the torque pulse can be implemented without relatively high outlay in systems which have a rapidly activatable electric motor, for example as a starter, starter alternator or the like.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A method for the reduction of load cycle oscillations in the drive train of a motor vehicle, the method comprising:
   detecting a magnitude of an available torque in the drive train of a motor vehicle;
   detecting a change in the available torque in the drive train of the motor vehicle, said change causing a load cycle oscillation having a period,
   determining the period of the load cycle oscillation, and
   during the commencement of the change in available torque, applying at least one torque pulse which causes an oscillation in phase opposition to the load cycle oscillation, wherein said torque pulse is produced by a motor, said torque pulse having a duration which is about half the period of the load cycle oscillation and a magnitude which is about half the magnitude of the available torque.

2. A method as in claim 1 wherein said torque pulse is triggered by a logic device.

3. A method as in claim 1 wherein said torque pulse is produced by an electric motor.

4. A method as in claim 1 wherein said torque pulse is produced by a starter motor of the vehicle.

5. A method as in claim 1 wherein said torque pulse is controlled by torque information from engine electronics.

6. A method as in claim 1 further comprising determining a change in rotational speed, and deriving control of the torque pulse from the change in rotational speed.

7. A method as in claim 1 wherein said torque pulse is applied to the engine of the motor vehicle.

8. A method as in claim 1 wherein said drive train comprises a flywheel having a primary part and a secondary part, said torque pulse being applied to one of said primary part and said secondary part.

9. A method as in claim 1 comprising applying a first torque pulse having a negative value with respect to said available torque, and applying a second torque pulse having a positive value with respect to said available torque.

10. A method as in claim 1 wherein said torque pulse commences at the time of synchronization during one of a gear change and starting the engine.

11. A method as in claim 1 wherein said torque pulse commences during one of a first rise in available torque and an engine torque in opposition to said available torque.

12. A method as in claim 1 comprising a first torque pulse and a second torque pulse, said second torque pulse commencing one period later than commencing the first torque pulse.

13. A method as in claim 1 comprising providing first, second, and third torque pulses in succession, said second torque pulse directed opposite to said first and third torque pulses.

14. An apparatus for the reduction of load cycle oscillations in the drive train of a motor vehicle, the apparatus comprising:
   means for detecting a change in an available torque in the drive train of a motor vehicle, said change causing a load cycle oscillation having a period,
   means for determining the period of the load cycle oscillation,
   means for generating first and second torque pulses coupled to the drive train, and
   logic means for triggering the first torque pulse during the commencing of a load cycle oscillation, and for triggering the second torque pulse one period later than triggering the first torque pulse, said logic means controlling said torque pulses so that they last half the period of the load cycle oscillation and are in phase opposition to the load cycle oscillation.

15. An apparatus as in claim 14 wherein said means for generating a torque pulse is an electric motor which is coupled to an internal combustion engine.

16. An apparatus as in claim 14 wherein said drive train comprises a flywheel having a primary part and a secondary part, said means for generating a torque pulse being coupled to one of said primary part and said secondary part.

17. A control program for the reduction of load cycle oscillations in the drive train of a motor vehicle, the program comprising the following program steps:
   detecting a change in an available torque in the drive train of a motor vehicle, said change causing a load cycle oscillation having a period,
   determining the period of the load cycle oscillation, and
   generating a control signal for generating a first torque pulse having a duration which is about half the period of the load cycle oscillation and is in phase opposition to the load cycle oscillation, said first torque pulse having a negative value with respect to said available torque, and generating a control signal for generating a second torque pulse having a positive value with respect to said available torque.

18. A control apparatus for the reduction of load cycle oscillations in the drive train of a motor vehicle, said control apparatus having a control program with a program code for carrying out the following steps:

detecting a change in an available torque in the drive train of a motor vehicle, said change causing a load cycle oscillation having a period, determining the period of the load cycle oscillation, and during the commencement of the change in available torque, applying successive first, second and third torque pulses which cause an oscillation in phase opposition to the load cycle oscillation, each said torque pulse having a duration which is about half the period of the load cycle oscillation, said second torque pulse being directed opposite to said first and third torque pulses.

19. A method for the reduction of load cycle oscillations in the drive train of a motor vehicle, the method comprising:

detecting a change in an available torque in the drive train of a motor vehicle, said change causing a load cycle oscillation having a period, determining the period of the load cycle oscillation, and during the commencement of the change in available torque, applying at least one torque pulse which causes an oscillation in phase opposition to the load cycle oscillation, wherein said torque pulse is produced by a rotating mass via a brake, said torque pulse having a duration which is about half the period of the load cycle oscillation.

* * * * *